US012687066B2

(12) United States Patent
Friman

(10) Patent No.: US 12,687,066 B2
(45) Date of Patent: Jul. 21, 2026

(54) MOTOR MAGNETIC BRAKE

(71) Applicant: Lutron Technology Company LLC, Coopersburg, PA (US)

(72) Inventor: Olli T. Friman, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 403 days.

(21) Appl. No.: 17/928,411

(22) PCT Filed: Jun. 18, 2021

(86) PCT No.: PCT/US2021/038143

§ 371 (c)(1),
(2) Date: Nov. 29, 2022

(87) PCT Pub. No.: WO2021/258022

PCT Pub. Date: Dec. 23, 2021

(65) Prior Publication Data

US 2023/0203882 A1 Jun. 29, 2023

Related U.S. Application Data

(60) Provisional application No. 63/041,352, filed on Jun. 19, 2020.

(51) Int. Cl.

*E06B 9/72* (2006.01)
*E06B 9/90* (2006.01)
*E06B 9/68* (2006.01)

(52) U.S. Cl.

CPC .................. *E06B 9/72* (2013.01); *E06B 9/90* (2013.01); *E06B 2009/6845* (2013.01)

(58) Field of Classification Search

CPC ...... H02K 2207/03; H02K 7/003; H02K 7/10; E06B 9/40; E06B 9/56; E06B 9/70; E06B 9/72; E06B 9/80; E06B 9/90; E06B 9/68; E06B 9/82; E06B 9/84; E06B 9/88; E06B 2009/807

See application file for complete search history.

(56) References Cited

U.S. PATENT DOCUMENTS 5,467,266 A 11/1995 Jacobs et al.
5,848,634 A 12/1998 Will et al.
6,497,267 B1 12/2002 Killo et al.
6,794,778 B1 9/2004 Walker et al.
(Continued)

*Primary Examiner* — Johnnie A. Shablack
*Assistant Examiner* — Matthew R. Shepherd
(74) *Attorney, Agent, or Firm* — Flaster Greenberg P.C.

(57) ABSTRACT

A motor drive unit may include a motor and a magnetic brake. The motor may be configured to be located within a motor drive unit housing of the motor drive unit. The motor may include a motor drive shaft defining a motor drive shaft rotational axis in a longitudinal direction. The motor drive shaft may be configured to rotate a roller tube of a motorized window treatment. The magnetic brake may include a stationary portion that includes a first plurality of magnets and a rotating portion that includes a second plurality of magnets. The first plurality of magnets may be configured to repel the second plurality of magnets such that repulsion between the first plurality of magnets and the second plurality of magnets generates a holding torque to prevent the motor drive shaft from rotating when the motor is not driving the motor drive shaft.

35 Claims, 12 Drawing Sheets

(56) References Cited

U.S. PATENT DOCUMENTS

| | | | | |
|---|---|---|---|---|
| 7,839,109 | B2 | 11/2010 | Carmen et al. | |
| 9,018,868 | B2 * | 4/2015 | Lucas | E06B 9/42 318/260 |
| 9,598,901 | B2 | 3/2017 | Kirby et al. | |
| 10,559,226 | B2 * | 2/2020 | Valeev | G09B 23/28 |
| 11,428,046 | B2 * | 8/2022 | Akiba | F16D 59/00 |
| 2001/0035016 | A1 * | 11/2001 | Weber | H02K 1/2753 62/210 |
| 2004/0090201 | A1 * | 5/2004 | Cavarec | E06B 9/68 318/16 |
| 2005/0238544 | A1 * | 10/2005 | Briscoe | F16H 19/04 422/562 |
| 2006/0006751 | A1 * | 1/2006 | Cavarec | H02K 49/108 310/77 |
| 2008/0023060 | A1 * | 1/2008 | Grumazescu | H10F 77/488 136/246 |
| 2008/0121353 | A1 * | 5/2008 | Detmer | E06B 9/90 160/311 |
| 2009/0090805 | A1 * | 4/2009 | Hwaung | E06B 9/72 160/310 |
| 2013/0276995 | A1 * | 10/2013 | Mullet | E06B 9/72 160/310 |
| 2014/0332172 | A1 * | 11/2014 | Hsieh | E06B 9/08 160/133 |
| 2016/0326801 | A1 | 11/2016 | Ogden et al. | |
| 2018/0161949 | A1 * | 6/2018 | Laber | B24B 23/028 |

* cited by examiner

MOTOR MAGNETIC BRAKE

CROSS-REFERENCE TO RELATED APPLICATIONS

This application is the 371 National Stage of International Application No. PCT/US2021/038143, filed Jun. 18, 2021, which claims priority to U.S. provisional patent application No. 63/041,352, filed Jun. 19, 2020, the disclosures of which are incorporated herein by reference in their entirety.

BACKGROUND

A motorized window treatment system may include a covering material (e.g., a flexible material) wound onto a roller tube. The covering material may include a weighted hembar at a lower end of the covering material, such that the covering material extends vertically (e.g., hangs) in front of a window. Motorized window treatments may include a drive system that is coupled to the roller tube to provide for tube rotation, such that the lower end of the covering material can be raised and lowered (i.e., moved in a vertical direction) by rotating the roller tube. The drive system may include a motor having a drive shaft and a gear train that is operatively coupled to (e.g., in communication with) the drive shaft and roller tube such that actuation of the motor causes the roller tube to rotate. The motor may be a direct current (DC) motor powered by a DC power source or an alternating current (AC) motor powered by an AC power source.

The drive system may include a brake to prevent movement of the motor shaft and/or roller tube due to the weight or inertia of the covering material and the weighted hembar.

SUMMARY

As described herein, a motorized window treatment may include a roller tube, a flexible material, a drive assembly (e.g., a motor drive unit), electrical wiring, and/or mounting brackets. The roller tube may be supported at opposed ends thereof. The flexible material may be attached (e.g., windingly attached) to the roller tube and may be operable between a raised position and a lowered position via rotation of the roller tube. The motor drive unit may include a motor and a magnetic brake. The motor may be configured to be located within the roller tube (e.g., within a motor drive unit housing). The motor may include a motor drive shaft defining a motor drive shaft rotational axis in a longitudinal direction. The motor drive shaft may be configured to rotate the roller tube to adjust the flexible material between the raised position and the lowered position.

The magnetic brake may be operatively coupled to the motor drive shaft. The magnetic brake may include a stationary portion that includes a first plurality of magnets and a rotating portion that includes a second plurality of magnets. The first plurality of magnets may be configured to repel the second plurality of magnets such that repulsion between the first plurality of magnets and the second plurality of magnets generates a holding torque. The holding torque may prevent the motor drive shaft from rotating when the motor is not driving the motor drive shaft. The rotating portion may be coupled to the motor drive shaft such that the rotating portion rotates with the motor drive shaft. The rotating portion may be press-fit onto, or otherwise secured to, the motor drive shaft. The stationary and rotating portions of the magnetic brake may be configured such that common poles of the first plurality of magnets are adjacent to common poles of the second plurality of magnets. The rotating portion may be retained within the stationary portion. The stationary portion may define a cavity configured to receive the rotating portion. The stationary portion may include a first stationary member and a second stationary member that define the cavity. The first stationary member may be configured to be attached to the motor. The second stationary member may be configured to be attached to the first stationary member. The repulsion between the first plurality of magnets and the second plurality of magnets prevents the rotating portion from contacting the first stationary member and the second stationary member. The rotating portion may be centered between the first stationary member and the secondary member by the repulsion (e.g., repelling force).

The rotating portion may include a first rotating member and a second rotating member. The first rotating member and the second rotating member may define a plurality of slots. Each of the plurality of slots may be configured to receive one of the second plurality of magnets. The plurality of slots may be configured to enable the second plurality of magnets to be in a first position proximate to the motor drive shaft when the motor drive shaft is not rotating. The plurality of slots may be configured to enable the second plurality of magnets to be in a second position distal from the motor drive shaft when the motor drive shaft is rotating. For example, the second position may be a farthest position within the plurality of slots from the motor drive shaft. The second plurality of magnets may be configured to move within the slots between the first position and the second position as the motor drive shaft transitions between rotating and not rotating. The first plurality of magnets may define a first circumference that is non-concentric to a second circumference defined by the second plurality of magnets. The first plurality of magnets may be spaced a first distance from the motor drive shaft rotational axis and the second plurality of magnets may be spaced a second distance from the motor drive shaft rotational axis. The second distance may be greater than the first distance.

DETAILED DESCRIPTION

Figure 1A:
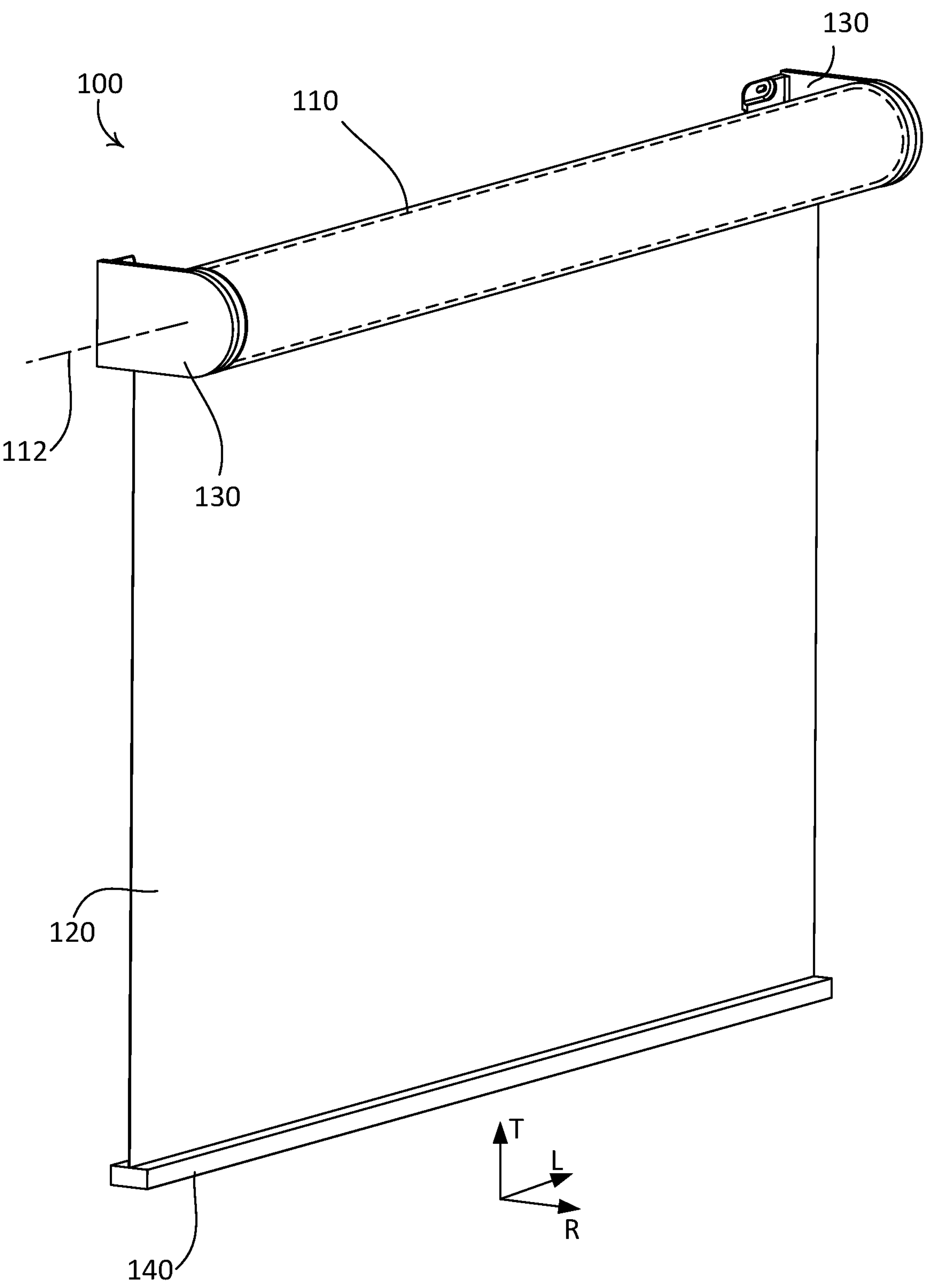
FIG. 1A is an example motorized window treatment.

FIG. 1A depicts an example motorized window treatment 100 (e.g., a motorized window treatment system) that includes a roller tube 110 and a flexible material 120 (e.g., a covering material) windingly attached to the roller tube 110. The motorized window treatment 100 may include one or more mounting brackets 130 configured to be coupled to or otherwise mounted to a structure. For example, each of the mounting brackets 130 may be configured to be mounted to (e.g., attached to) a window frame, a wall, or other structure, such that the motorized window treatment 100 is mounted proximate to an opening (e.g., over the opening or in the opening), such as a window for example. The mounting brackets 130 may be configured to be mounted to a vertical structure (e.g., wall-mounted to a wall as shown in FIG. 1A) and/or mounted to a horizontal structure (e.g., ceiling-mounted to a ceiling).

The roller tube 110 may operate as a rotational element of the motorized window treatment 100. The roller tube 110 may be elongate along a longitudinal direction L and rotatably mounted (e.g., rotatably supported) by the mounting brackets 130. The roller tube 110 may define a longitudinal axis 112. The longitudinal axis 112 may extend along the longitudinal direction L. The mounting bracket 130 may extend from the structure in a radial direction R. The radial direction R may be defined as a direction perpendicular to the structure and the longitudinal axis 112. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised (e.g., open) position and a lowered (e.g., closed) position (e.g., as shown in FIG. 1A) along the transverse direction T.

The roller tube 110 may be a low-deflection roller tube and may be made of a material that has high strength and low density, such as carbon fiber. The roller tube 110 may have, for example, a diameter of approximately two inches. For example, the roller tube 110 may exhibit a deflection of less than ¼ of an inch when the flexible material 120 has a length of 12 feet and a width of 12 feet (e.g., and the roller tube 110 has a corresponding width of 12 feet and the diameter is two inches). Examples of low-deflection roller tubes are described in greater detail in U.S. Patent Application Publication No. 2016/0326801, published Nov. 10, 2016, entitled LOW-DEFLECTION ROLLER SHADE TUBE FOR LARGE OPENINGS, the entire disclosure of which is hereby incorporated by reference. Alternatively, the roller tube may be made of another material, such as extruded aluminum, for example.

The flexible material 120 may include a first end (e.g., a top or upper end) that is coupled to the roller tube 110 and a second end (e.g., a bottom or lower end) that is coupled to a hembar 140. The hembar 140 may be configured, for example weighted, to cause the flexible material 120 to hang vertically. Rotation of the roller tube 110 may cause the hembar 140 to move toward or away from the roller tube 110 between the raised and lowered positions. An end cap (not shown) may be installed on each end of the hembar 140. The end caps may be configured to cover the opposed ends of the hembar 140. For example, each end cap may provide a finished end to the hembar 140.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material.

The motorized window treatment 100 may include a drive assembly (e.g., motor drive unit 190). The drive assembly may include a motor assembly (e.g., such as the motor assembly 200 shown in FIGS. 2-3, the motor assembly 300 shown in FIG. 4, the motor assembly 400 shown in FIG. 5, and/or the motor assembly 500 shown in FIGS. 6-8). The drive assembly may at least partially be disposed within the roller tube 110. For example, the drive assembly may include a control circuit that may include a microprocessor and may be mounted to a printed circuit board. The drive assembly may be powered by a power source (e.g., an alternating-current or direct-current power source) provided by electrical wiring. The drive assembly may be operably coupled to the roller tube 110 such that when the drive assembly is actuated, the roller tube 110 rotates. The drive assembly may be configured to rotate the roller tube 110 of the example motorized window treatment 100 such that the flexible material 120 is operable between the raised position and the lowered position. The drive assembly may be configured to rotate the roller tube 110 while reducing noise generated by the drive assembly (e.g., noise generated by one or more gear stages of the drive assembly). Examples of drive assemblies for motorized window treatments are described in greater detail in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 9,598,901, issued Mar. 21, 2017, entitled QUIET MOTORIZED WINDOW TREATMENT SYSTEM, the entire disclosures of which are hereby incorporated by reference.

Figure 1B:
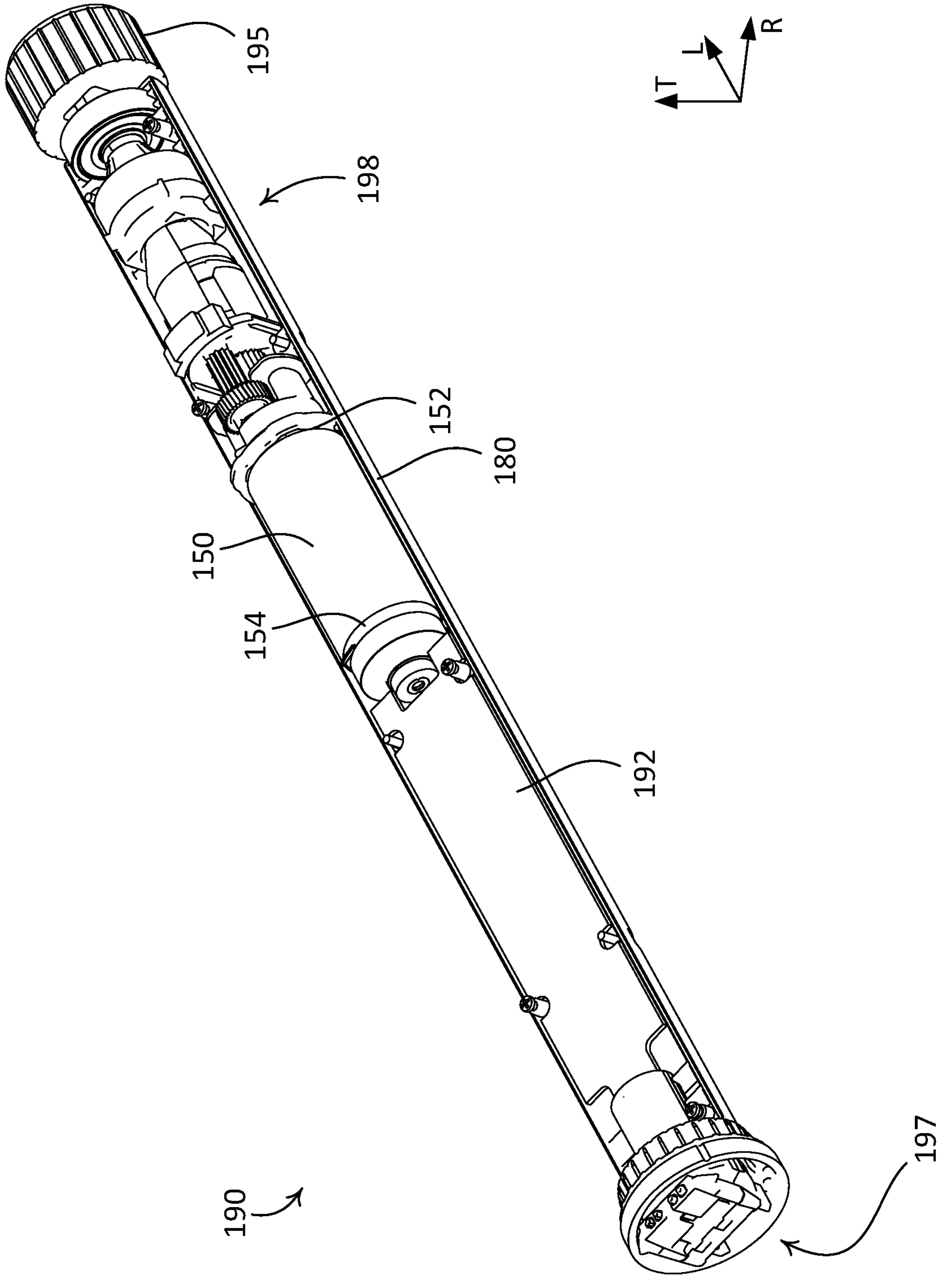
FIG. 1B is a perspective view of an example motor drive unit for use in the example motorized window treatment shown in FIG. 1A.

FIG. 1B depicts an example motor drive unit 190 configured for use in a motorized window treatment (e.g., such as the example motorized window treatment 100 shown in FIG. 1A). The motor drive unit 190 may include a housing 180. The housing 180 may be configured to enclose one or more components of the motor drive unit 190. A roller tube (e.g., the roller tube 110 shown in FIG. 1A) of the motorized window treatment may receive (e.g., at least a portion of) the housing 180.

The motor drive unit 190 may include a motor 150, a printed circuit board 192, and a gear assembly 198. The motor drive unit 190 may be operatively coupled to the roller tube 110. The motor 150 may include a drive shaft (e.g., such as the drive shaft 205 shown in FIGS. 2-3, the drive shaft 305 shown in FIG. 4, the drive shaft 405 shown in FIG. 5, and/or the drive shaft 505 shown in FIGS. 6, 8A, and 8B). The drive shaft may extend from a drive end 152 (e.g., front surface) of the motor 150. The drive shaft (e.g., a front shaft, not shown) may be part of a rotor of the motor 150 and may be connected to the gear assembly 198. The rotor may include a rear shaft 156 on the opposite side (e.g., non-drive end 154) of the motor 150. The rear shaft 156 may extend from the non-drive end 154 of the motor 150. For example, the motor drive unit 190 may include a coupler 195 (e.g., a drive coupler) that may be coupled to the gear assembly 198 for rotating the coupler 195 in response to rotations of the motor 150. For example, the coupler 195 may be an output gear that is driven by the motor 150 and transfers rotation of the motor 150 to the roller tube. The coupler 195 may engage the roller tube (e.g., an inner surface of the roller tube). The end portion 197 of the motor drive unit 190 may be configured to attach to (e.g., be received by) the bracket 130A such that the motor 150 torques against the bracket 130A to rotate the coupler 195. The end portion 197 of the motor drive unit 190 may engage the roller tube 110 (e.g., an inner surface of the roller tube 110). For example, the end portion 197 of the motor drive unit 190 may include a bearing (not shown) that enables the roller tube 110 to rotate. The roller tube 110 may rotate with the motor 150 (e.g., the rotor).

Figure 2:
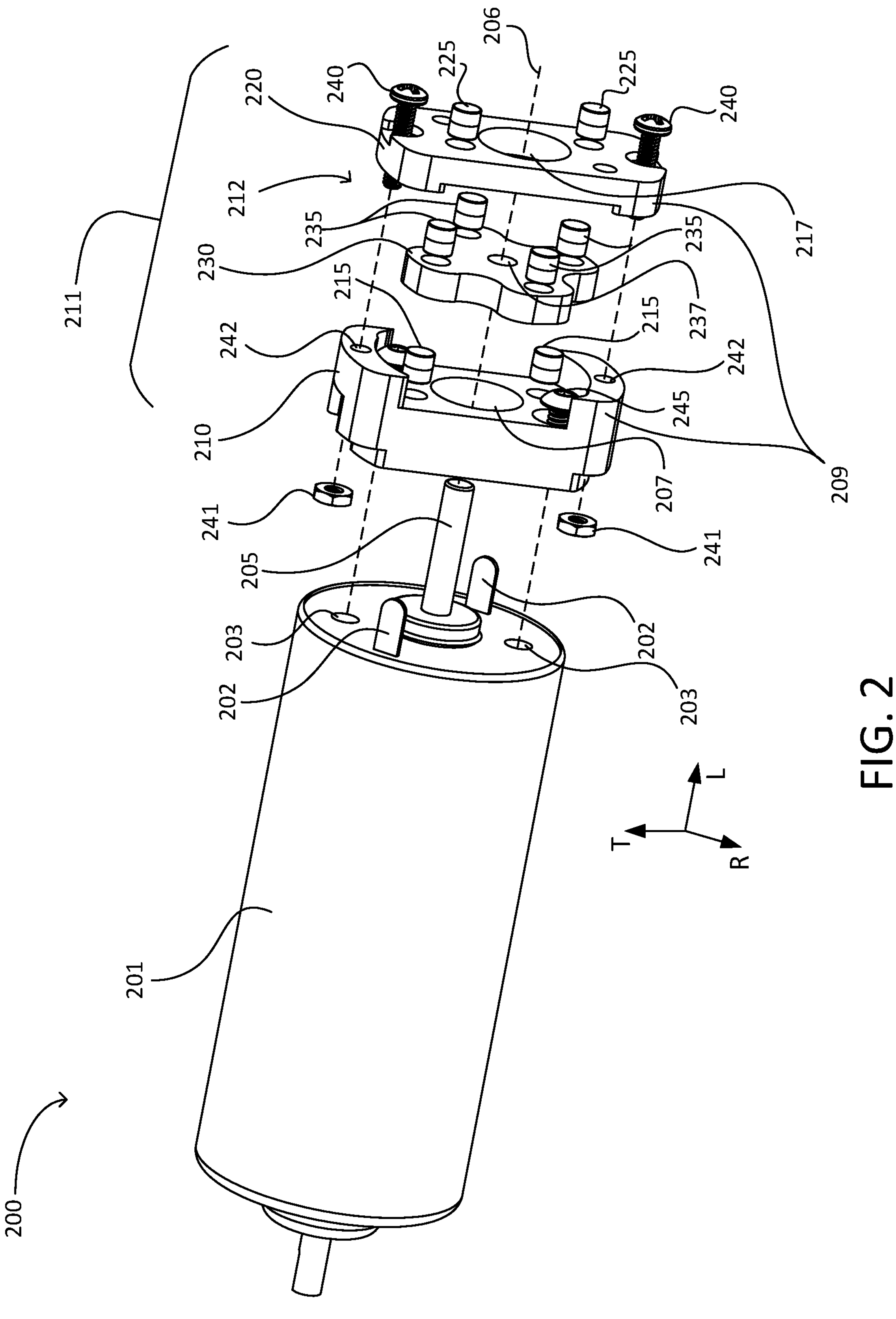
FIG. 2 is a partially exploded view of an example motor assembly for use in the example motorized window treatment shown in FIG. 1A.
Figure 3:
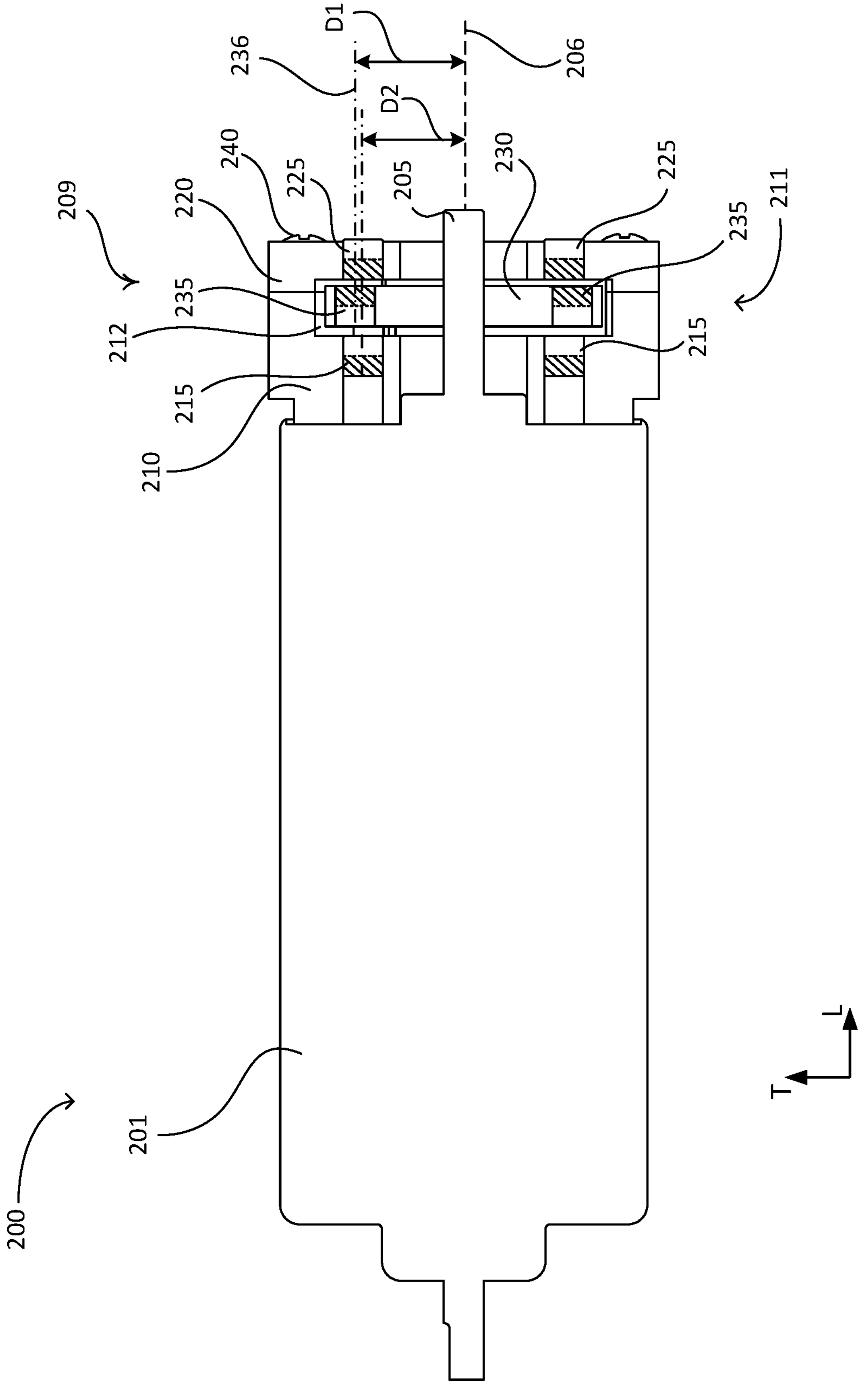
FIG. 3 is a cross-section view of the example motor assembly shown in FIG. 2.

FIGS. 2 and 3 depict an example motor assembly 200 configured for use with a motorized window treatment (e.g., such as the motorized window treatment 100 shown in FIG. 1A). For example, the motor assembly 200 may be used in a motor drive unit (e.g., such as motor drive unit 190 shown in FIG. 1B) of the motorized window treatment. The motor assembly 200 may include a motor 201 and a motor brake 211, also referred to herein as a magnetic brake 211. The motor 201 and the magnetic brake 211 may be configured to be located within a roller tube (e.g., roller tube 110) of the motorized window treatment (e.g., within a housing of the drive assembly). The motor 201 may include a motor drive shaft 205. The motor 201 may be configured to be operatively coupled to the roller tube, for example, via the motor drive shaft 205 and a gear assembly (e.g., such as gear assembly 198 shown in FIG. 1B). The motor drive shaft 205 may define a motor drive shaft rotational axis 206 in the longitudinal direction L. The motor drive shaft 205 may be configured to rotate the roller tube (e.g., through the gear assembly) to adjust a flexible material of the motorized window treatment between a raised position and a lowered position.

The magnetic brake 211 may be configured to stop and hold the motor 201 (e.g., the motor drive shaft 205) and the roller tube in place when the motorized window treatment is not being operated. For example, the magnetic brake 211 may be configured to prevent rotation of the motor drive shaft 205 when the motor 201 is not driving the motor drive shaft 205. The magnetic brake 211 may be operatively coupled to the motor drive shaft 205. That is, the motor drive shaft 205 may receive (e.g., carry) a portion of the magnetic brake 211. The magnetic brake 211 may include a plurality of magnets (e.g., magnets 215, 225, 235). The magnets 215, 225, 235 may be arranged in a repelling position within the magnetic brake 211. For example, the magnets 215, 225, 235 may generate a holding torque that prevents the motor drive shaft 205 from rotating when the motor 201 is not driving the motor drive shaft 205. The holding torque may be generated by the repulsion (e.g., repelling forces) between adjacent magnets of the magnets 215, 225, 235. The number of magnets 215, 225, 235 may be configured based on the amount of holding torque required, a diameter of the magnets 215, 225, 235, and/or a distance of the magnets 215, 225, 235 from the motor drive shaft rotational axis 206. The holding torque required for the motor drive shaft 205 may vary based on a length of the roller tube, and a weight of the flexible material which may be based on a type of flexible material, and/or an amount of flexible material wound onto the roller tube. The magnets 215, 225, 235 may be rare-earth magnets (e.g., such as neodymium magnets) or another type of strong permanent magnet.

The magnetic brake 211 may be an assembly that includes a stationary portion 209 and a rotating portion 230. The stationary portion 209 may be configured to enclose the rotating portion 230. Stated differently, the rotating portion 230 may be retained or located within the stationary portion 209. The stationary portion 209 may define a cavity 212 that receives and retains the rotating portion 230. The stationary portion 209 may remain stationary relative to the drive shaft 205. For example, the stationary portion 209 may be attached to the motor 201 and/or the motor drive unit housing. The rotating portion 230 may define a motor drive shaft aperture 237 that is configured to receive the motor drive shaft 205. The rotating portion 230 may be coupled to the motor drive shaft 205 (e.g., via the motor drive shaft aperture 237) such that the rotating portion 230 rotates with the motor drive shaft 205. For example, the rotating portion 230 may be press-fit onto the motor drive shaft 205. Additionally or alternatively, the rotating portion 230 may be splined onto the motor drive shaft 205. The stationary portion 209 may include one or more magnets (e.g., magnets 215, 225). The rotating portion 230 may include one or more magnets 235.

The stationary portion 209 may include two members—a first stationary member 210 and a second stationary member 220. The first stationary member 210 may be proximate to the motor 201. For example, the first stationary member 210 may be attached to the motor 201. The second stationary member 220 may be distal from the motor 201. The first stationary member 210 may include or define a first aperture 207 configured to receive (e.g., and not contact) the motor drive shaft 205 and the second stationary member 220 may include or define a second aperture 217 configured to receive (e.g., and not contact) the motor drive shaft 205. The magnetic brake 211 may include fasteners (e.g., fasteners 240, 245). One or more fasteners 245 may be configured to secure the first stationary member 210 to the motor 201. For example, the fasteners 245 may be received by respective apertures 203 in the motor 201 to secure the stationary portion 209 to the motor 201. One or more fasteners 240 may be configured to secure the second stationary member 220 to the first stationary member 210. For example, the first stationary member 210 may include apertures 242 that are configured to receive the fasteners 240. The fasteners 240 may extend through the second stationary member 220 and through respective ones of the apertures 242 in the first stationary member 210. The fasteners 240 may be configured to receive a nut 241 on the motor side of the first stationary member 210. The nuts 241 and fasteners 240 may be configured to secure the first stationary member 210 to the second stationary member 220. The nuts 241 may be accessible when the first stationary member 210 is secured to the motor 201. The first and second stationary members 210, 220 may define the cavity 212, for example, when the second stationary member 220 is attached to the first stationary member 210. The motor 201 may include terminals 202 that extend from the motor 201 (e.g., towards the magnetic brake 211). For example, the terminals 202 may extend on either side of the magnetic brake 211 (e.g., the first stationary member 210) when the first stationary member

210 is secured to the motor 201. The terminals 202 may be accessible when the magnetic brake 211 is secured to the motor 201.

The first stationary member 210 may include a first plurality of magnets 215 (e.g., such as two magnets). For example, the first plurality of magnets 215 may be retained within (e.g., press-fit into) the first stationary member 210. The second stationary member 220 may include a second plurality of magnets 225 (e.g., such as two magnets). For example, the second plurality of magnets 225 may be retained within (e.g., press-fit into) the second stationary member 220. The rotating portion 230 may include a third plurality of magnets 235 (e.g., such as four magnets). For example, the third plurality of magnets 235 may be retained within (e.g., press-fit into) the rotating portion 230. Each respective set of magnets 215, 225, 235 may be arranged symmetrically about the motor drive shaft 205 (e.g., the motor drive shaft rotational axis 206), for example, to prevent radial forces on the motor drive shaft 205. That is, the first plurality of magnets 215 may be arranged symmetrically about the motor drive shaft rotational axis 206, the second plurality of magnets 225 may be arranged symmetrically about the motor drive shaft rotational axis 206, and the third plurality of magnets 235 may be arranged symmetrically about the motor drive shaft rotational axis 206. A potential disadvantage of the magnets 215, 225, 235 not being arranged symmetrically about the motor drive shaft 205 is that tangential linear force components from adjacent magnets may apply a radial force(s) (e.g., in the radial direction R and/or the transverse direction T) on the motor drive shaft 205.

Each of the first plurality of magnets 215, the second plurality of magnets 225, and the third plurality of magnets 235 may be disposed symmetrically about the motor drive shaft 205/motor drive shaft rotational axis 206. The first plurality of magnets 215 and the second plurality of magnets 225 may be located within the first stationary member 210 and the second stationary member 210, respectively, such that they are aligned with each other. For example, one magnet of the first plurality of magnets 215 may be laterally aligned (e.g., in the longitudinal direction) with one magnet of the second plurality of magnets 225 such that they define a first axis through their respective centers that is parallel to the motor drive shaft rotational axis 206. Another magnet of the first plurality of magnets 215 may be laterally aligned (e.g., in the longitudinal direction L) with another magnet of the second plurality of magnets 225 such that they define a second axis through their respective centers that is parallel to the motor drive shaft rotational axis 206. The first plurality of magnets 215 and the second plurality of magnets 225 may be located about respective circles (e.g., evenly spaced around) centered on the motor drive shaft rotational axis 206. Each of the respective circles may have the same radius. The third plurality of magnets 235 may be equally spaced about (e.g., be disposed symmetrically about) the motor drive shaft 205/motor drive shaft rotational axis 206. For example, the third plurality of magnets 235 may be equally spaced around a circle centered on the motor drive shaft rotational axis 206. The circle defined by the third plurality of magnets 235 may define a radius that may be the same or different than the radius of the circle defined by the first and second plurality of magnets 215, 225. When the motor 201 is not operating, two of the third plurality of magnets 235 (e.g., that are separated by approximately 180 degrees) may be radially aligned with the first and second plurality of magnets 215, 225.

The first and second plurality of magnets 215, 225 and the third plurality of magnets 235 may be arranged such that a first repelling force (e.g., in the longitudinal direction L) is generated between the first plurality of magnets 215 and the third plurality of magnets 235 and a second repelling force (e.g., in the longitudinal direction L) is generated between the second plurality of magnets 225 and the third plurality of magnets 235. The first repelling force may be generated by repulsion between the first plurality of magnets 215 and the third plurality of magnets 235. The first repelling force may be configured to repel the rotating portion 230 away from the motor 201. The second repelling force may be generated by repulsion between the second plurality of magnets 225 and the third plurality of magnets 235. The second repelling force may be configured to repel the rotating portion 230 towards the motor 201. The first repelling force and the second repelling force may generate the holding torque on the motor drive shaft 205. The holding torque may be a braking force that maintains the motor drive shaft 205 in a fixed position (e.g., rotational position) when the motor 201 is not operating. The first and second repelling forces may also minimize (e.g., prevent) axial movement of the motor drive shaft 205 along the motor drive shaft rotational axis 206.

The first repelling force and the second repelling force may be configured to locate the rotating portion 230 (e.g., in equilibrium) between the first rotating portion 210 and the second rotating portion 220. For example, the first repelling force may be equal to or substantially equal to the second repelling force. The first repelling force and the second repelling force may prevent the rotating portion 230 from contacting the first stationary member 210 and/or the second stationary member 220, for example, when the motor 201 is operating and/or when the motor 201 is not operating. For example, the rotating portion 230 may be centered between the first stationary portion 210 and the second stationary portion 220 by the first repelling force and the second repelling force. When the magnets are arranged such that the first and second plurality of magnets 215, 225 attract the third plurality of magnets 235, the plurality of magnets 235 may be pulled further off center if the plurality of magnets 235 did not have identical spaces to the plurality of magnets 215, 225 which may cause vibration and noise. When the magnets are arranged such that the first and second plurality of magnets 215, 225 repel the third plurality of magnets 235, the rotating portion 230 may automatically self-center between the first stationary portion 210 and the second stationary portion 220.

Poles of the first plurality of magnets 215 may be arranged in the same orientation or direction as the poles of the second plurality of magnets 225. Opposite poles of the first plurality of magnets 215 and the second plurality of magnets 225 may be adjacent (e.g., proximate) to the rotating portion 230 (e.g., the third plurality of magnets 235). For example, common or like poles of the first and second plurality of magnets 215, 225 may be adjacent to the third plurality of magnets 235. Stated differently, north poles of the third plurality of magnets 235 may face north poles of the first plurality of magnets 215 and south poles of the third plurality of magnets 235 may face south poles of the second plurality of magnets 225. Alternatively, south poles of the third plurality of magnets 235 may face south poles of the first plurality of magnets 215 and north poles of the third plurality of magnets 235 may face north poles of the second plurality of magnets 225. The first plurality of magnets 215 may each be the same magnet (e.g., size, material, etc.). The second plurality of magnets 225 may each be the same magnet (e.g., size, material, etc.). The third plurality of magnets 235 may each be the same magnet (e.g., size, material, etc.). The first plurality of magnets 215 may include the same magnets as the second plurality of magnets 225. The third plurality of magnets 235 may include the same or different magnets than the first plurality of magnets 215 and/or the second plurality of magnets 225.

The respective circles formed by the first plurality of magnets 215, the second plurality of magnets 225, and the third plurality of magnets 235 may be concentric (e.g., about the motor drive shaft rotational axis 206). The circle formed by the third plurality of magnets 235 may define a circumference that is different from a circumference defined by the circle formed by the first plurality of magnets 215 and/or the second plurality of magnets 225. For example, the third plurality of magnets 235 (e.g., a rotational circumference defined by the third plurality of magnets 235) may be spaced a first distance D1 from the motor drive shaft rotational axis 206 and the first and second plurality of magnets 215, 225 (e.g., a rotational circumference defined by the first and second plurality of magnets 215, 225) may be spaced a second distance D2 from the motor drive shaft rotational axis 206. The first distance D1 may be different than the second distance D2. For example, the first distance D1 may be greater than the second distance D2 (e.g., as shown in FIG. 3). In an example, D1 may be approximately 8.3 millimeters, and D2 may be approximately 8 millimeters. It should be appreciated that the difference in length between D1 and D2 may be greater than 0.3 millimeters (e.g., and larger than 1 millimeter), however, as the third plurality of magnets 235 move farther apart axially from the first and second plurality of magnets 215, 225, the holding (e.g., braking) capacity of the magnets may be reduced. Further, it should be appreciated that in other examples, the first distance D1 may be less than the second distance D2. However, one advantage of having D1 greater than D2 (e.g., with limited diameter available) is that the moment arm is maximized and a higher holding torque is achieved with the same outside dimension of the magnetic brake 211. For example, the moment arm is increased as the mass of the third plurality of magnets 235 is located further from the motor drive shaft rotational axis 206.

Oscillation of the motor 201 and/or the motor drive shaft 205 may be reduced when D1 does not equal D2. A circumference defined by the third plurality of magnets 235 may have a radius equal to the first distance D1 and the circumference defined by the first and second plurality of magnets 215, 225 may have a radius equal to the second distance D2. If the rotational magnets (e.g., the third plurality of magnets 235) were to become rotationally offset (e.g., non-concentric) from the stationary magnets (e.g., the first and second plurality of magnets 215, 225), having the first distance D1 not equal to the second distance D2 (e.g., the rotational circumference defined by the third plurality of magnets 235 is different than the rotational circumference defined by the first plurality of magnets 215 and/or the second plurality of magnets 225) may reduce a level of oscillation (e.g., in a direction perpendicular to the longitudinal direction L) as when compared to if the distance D1 equals the distance D2. For example, when the magnets 215, 225, and 235 are the same distance from the motor drive shaft rotational axis 206 (e.g., the distance D1 equals the distance D2) a greater radial force (e.g., perpendicular to the motor drive shaft rotational axis 206) may be applied on the motor drive shaft 205 as the magnets pass each other as the motor drive shaft 205 spins if the magnets 215, 225, 235 become offset (e.g., non-concentric) when compared to if the third plurality of magnets 235 are spaced a different distance D1 from the motor drive shaft rotational axis 206 than the distance D2 of the first and second plurality of magnets 215, 225. That is, as the motor drive shaft 205 rotates, each of the third plurality of magnets 235 periodically are located adjacent to respective magnets of the first plurality of magnets 215 and the second plurality of magnets 225. During operation, the motor drive shaft 205 may deviate (e.g., slightly) from the motor drive shaft rotational axis 206. When the distance D1 equals the distance D2, a radial force generated by the magnets 215, 225, 235 may be greater than when the distance D1 is different than the distance D2, for example, because the force between adjacent magnets may be applied to the motor drive shaft 205 in the same direction.

A holding torque profile of repelling magnets may be smoother (e.g., induce less vibration/oscillation) than a holding torque profile of attracting magnets such that starting motion and stopping motion of the motor 201 is smoother (e.g., induce less vibration/oscillation) when the magnets 215, 225, 235 are arranged in a repelling position with respect to one another. The magnets 215, 225, 235 arranged in the repelling position may enable a reduction in starting torque required from the motor 201 when compared to magnets arranged in an attracting position. For example, when the motor 201 is at rest, two of the third plurality of magnets 235 (e.g., that are separated by approximately 180 degrees) may be rotationally aligned with the first and second plurality of magnets 215, 225 such that the holding torque of the magnetic brake 211 is at a maximum. Alternatively, when the motor 201 is at rest, the third plurality of magnets 235 may be misaligned (e.g., rotationally) with the first and second plurality of magnets 215, 225, for example, because the first and second plurality of magnets 215, 225 are in a repelling position with respect to the third plurality of magnets 235. In this configuration, when starting the motor 201 the motor drive shaft 205 may be reversed by approximately 45 degrees and then started (e.g., in the forward/starting direction). For example, the motor drive shaft 205 may be driven in a direction opposite of the desired direction (e.g., reversed) such that the third plurality of magnets 235 are located as far as possible (e.g., circumferentially) from the first and second plurality of magnets 215, 225 (e.g., in between two adjacent magnets and/or approximately 45 degrees from each of the two adjacent magnets, when four magnets are used as shown). When the third plurality of magnets 235 are located as far as possible (e.g., circumferentially) from the first and second plurality of magnets 215, 225, the repelling forces between the magnets 215, 225, 235 and the holding torque may be at a minimum. When the third plurality of magnets 235 are located as far as possible (e.g., circumferentially) from the first and second plurality of magnets 215, 225, the motor 201 may require a minimum amount of starting torque. When the third plurality of magnets 235 are located as far as possible (e.g., circumferentially) from the first and second plurality of magnets 215, 225, the motor drive shaft 205 may be driven in the desired direction (e.g., forward). Here, inertia of the motor assembly 200 may be used to overcome the repelling forces and the holding torque.

It should be appreciated that the holding torque capability of the magnetic brake 211 may be based on a distance between the stationary magnets (e.g., the first and second plurality of magnets 215, 225) and the rotating magnets (e.g., the third plurality of magnets 235) in the longitudinal direction L. For example, the closer the rotating magnets (e.g., the third plurality of magnets 235) are to the stationary magnets (e.g., the first and second plurality of magnets 215, 225) within the magnetic brake 211 in the longitudinal direction L, the stronger the holding torque capability of the magnetic brake 211 may be. The distance between the stationary magnets (e.g., the first and second plurality of magnets 215, 225) and the rotating magnets (e.g., the third plurality of magnets 235) in the longitudinal direction L may be adjusted based on a size and/or shape of the first stationary member 210 and/or the second stationary member 220. It should also be appreciated that the holding torque capability of the magnetic brake 211 may be based on a distance between the stationary magnets (e.g., the first and second plurality of magnets 215, 225) and the rotating magnets (e.g., the third plurality of magnets 235) in a rotational or radially direction (e.g., a radial direction R and/or a transverse direction T). Stated differently, the holding torque capability of the magnetic brake 211 may increase as the distance D1 becomes closer to the distance D2. For example, the closer the rotating magnets (e.g., the third plurality of magnets 235) are to the stationary magnets (e.g., the first and second plurality of magnets 215, 225) within the magnetic brake 211 in the rotational direction, the stronger the holding torque capability of the magnetic brake 211 may be.

It should further be appreciated that when the motor 201 is not operating, the lateral alignment between the stationary magnets (e.g., the first and second plurality of magnets 215, 225) and the rotating magnets (e.g., the third plurality of magnets 235) within the magnetic brake 211 may vary (e.g., rotationally and/or circumferentially) based on a position of the flexible material attached to the roller tube. For example, the stationary magnets (e.g., the first and second plurality of magnets 215, 225) and the rotating magnets (e.g., the third plurality of magnets 235) may be better aligned when the flexible material is in a lowered position (e.g., to apply a greater holding torque to the motor drive shaft 206). The stationary magnets (e.g., the first and second plurality of magnets 215, 225) and the rotating magnets (e.g., the third plurality of magnets 235) may be more misaligned when the flexible material is in a raised position (e.g., to apply a lesser holding torque to the motor drive shaft 206).

The magnetic brake 211 may not generate heat (e.g., a significant amount of heat) in the motor assembly 200. For example, the magnetic brake 211 may not apply, or may minimize, a holding torque on the motor drive shaft 206 when the motor 201 is operating. The magnetic brake 211 may enable holding and/or starting torque adjustments. For example, a size and/or number of magnets 215, 225, 235 may be changed to adjust an amount of holding torque applied by the magnetic brake 211 and/or an amount of starting torque required by the motor 201. As described herein, the magnet configuration of the magnetic brake 211 is not limited to 2,4,2 (e.g., two magnets—first stationary member 210, four magnets—rotating portion 230, two magnets—second stationary member 220) as shown in FIGS. 2-3. It should be appreciated that the magnet configuration of the magnetic brake 211 may have various magnet configurations, for example, such as 4,4,4; 4,2,4; 3,3,3; 2,6,2; 2,8,2; 8,2,8; 3,6,3; 3,12,3; 12,3,12; 6,12,6; 12,6,12; 12,12,12; 6,6,6; and/or the like.

Figure 4:
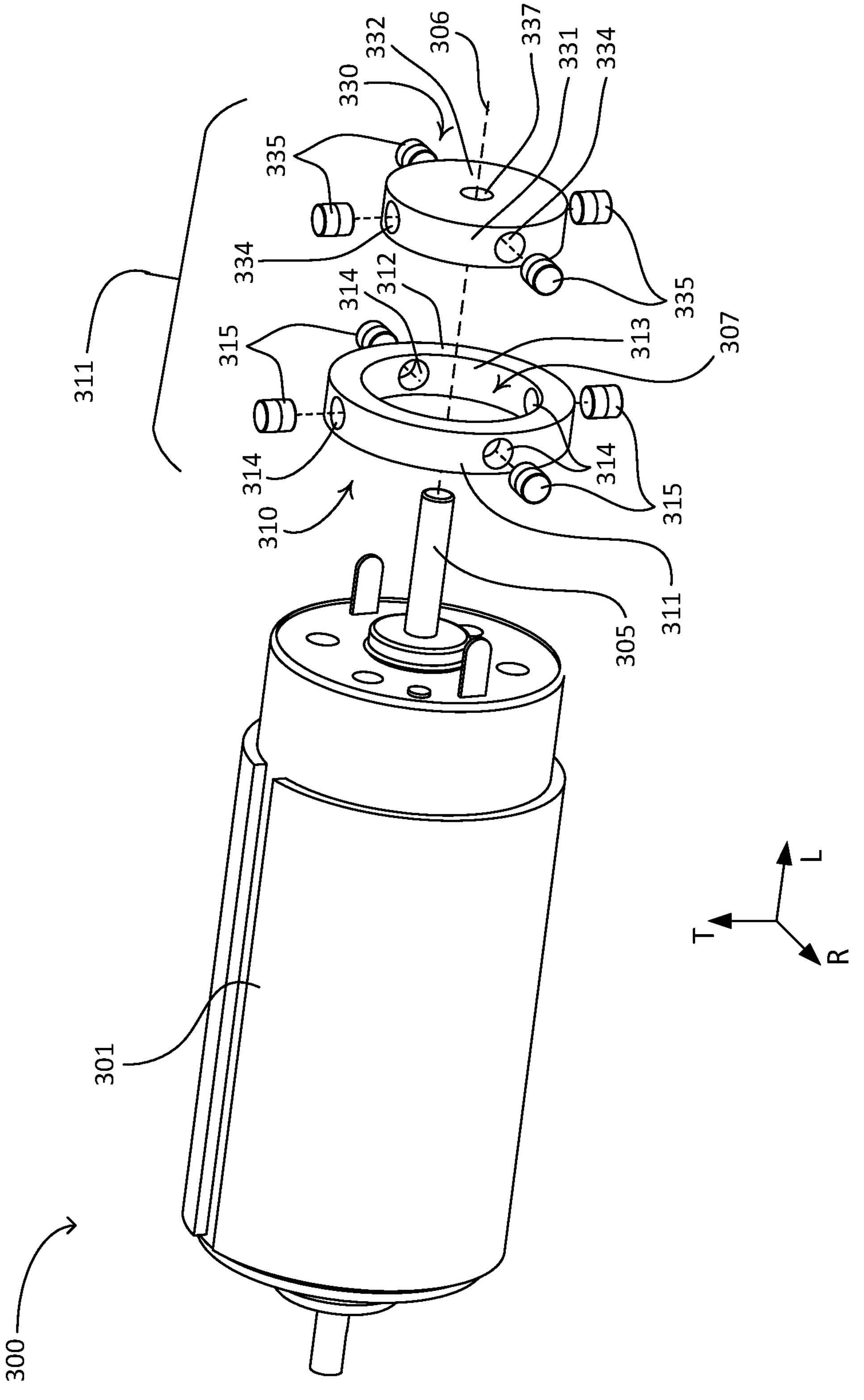
FIG. 4 is a partially exploded view of another example motor assembly for use in the example motorized window treatment shown in FIG. 1A.

FIG. 4 depicts an example motor assembly 300 configured for use with a motorized window treatment (e.g., such as the motorized window treatment 100 shown in FIG. 1A). For example, the motor assembly 300 may be used in a motor drive unit (e.g., such as motor drive unit 190 shown in FIG. 1B). The motor assembly 300 may include a motor 301 and a motor brake 311, also referred to herein as a magnetic brake 311. The motor 301 and the magnetic brake 311 may be configured to be located within a roller tube (e.g., roller tube 110) of the motorized window treatment (e.g., within a housing of the motor drive unit). The motor 301 may include a motor drive shaft 305. The motor 301 may be configured to be operatively coupled to the roller tube, for example, via the motor drive shaft 305 and a gear assembly (e.g., such as gear assembly 198 shown in FIG. 1B). The motor drive shaft 305 may define a motor drive shaft rotational axis 306 in the longitudinal direction L. The motor drive shaft 305 may be configured to rotate the roller tube (e.g., through the gear assembly) to adjust a flexible material of the motorized window treatment between a raised position and a lowered position.

The magnetic brake 311 may be configured to stop and hold the motor 201 (e.g., the motor drive shaft 305) and the roller tube in place when the motorized window treatment is not being operated. For example, the magnetic brake 311 may be configured to prevent rotation of the motor drive shaft 305 when the motor 301 is not driving the motor drive shaft 305. The magnetic brake 311 may be operatively coupled to the motor drive shaft 305. That is, the motor drive shaft 305 may receive (e.g., carry) a portion of the magnetic brake 311. The magnetic brake 311 may include a plurality of magnets (e.g., magnets 315, 335). The magnets 315, 335 may be arranged in a repelling position within the magnetic brake 311. For example, the magnets 315, 335 may generate a holding torque that prevents the motor drive shaft 305 from rotating when the motor 301 is not driving the motor drive shaft 305. The holding torque may be generated by the repulsion (e.g., repelling forces) between adjacent magnets of the magnets 315, 335. The number of magnets 315, 335 may be configured based on the amount of holding torque required, a diameter of the magnets 315, 335, and/or a distance of the magnets 315, 335 from the motor drive shaft rotational axis 306. The holding torque required for the motor drive shaft 305 may vary based on a length of the roller tube, and a weight of the flexible material which may be based on a type of flexible material, and/or an amount of flexible material wound onto the roller tube. The magnets 315, 335 may be rare-earth magnets (e.g., such as neodymium magnets) or another type of strong permanent magnet.

The magnetic brake 311 may be an assembly that includes a stationary ring 310 and a rotating disk 330. The stationary ring 310 may be configured to surround the rotating disk 330. Stated differently, the rotating disk 330 may be retained or located within the stationary ring 310 when operably coupled to the motor drive shaft 305. The stationary ring 310 may define an outer surface 311, an inner surface 313, and a cavity 312 that receives and retains the rotating disk 330. The stationary ring 310 may be configured to remain stationary relative to the motor drive shaft 305. For example, the stationary ring 310 may be attached to the motor 301 and/or the motor drive unit housing. The rotating disk 330 may define a motor drive shaft aperture 337 that is configured to receive the motor drive shaft 305. The rotating disk 330 may be coupled to the motor drive shaft 305 (e.g., via the motor drive shaft aperture 337) such that the rotating disk 330 rotates with the motor drive shaft 305. For example, the rotating disk 330 may be press-fit onto the motor drive shaft 305. Additionally or alternatively, the rotating disk 330 may be splined onto the motor drive shaft 305. The rotating disk 330 may define an outer surface 331 that is configured to be proximate to the inner surface 313 of the stationary ring 310. The stationary ring 310 may include a first plurality of magnets 315 (e.g., such as four magnets). The rotating disk 330 may include a second plurality of magnets 335 (e.g., such as four magnets).

The first plurality of magnets 315 may be retained within (e.g., press-fit into) the stationary ring 310. For example the stationary ring 310 may define apertures 314 that extend from the outer surface 311 to the inner surface 313. The apertures 314 may receive (e.g., radially) the first plurality of magnets 315 such that one pole of the first plurality of magnets faces toward (e.g., radially) the motor drive shaft rotational axis 306 and the other pole of the first plurality of magnets faces away (e.g., radially) from the motor drive shaft rotational axis 306. The first plurality of magnets 315 may be retained within (e.g., press-fit into) the apertures 314 of the stationary ring 310. The second plurality of magnets 335 may be retained within (e.g., press-fit into) the rotating disk 330. Each respective set of magnets 315, 335 may be arranged symmetrically about the motor drive shaft 305 (e.g., the motor drive shaft rotational axis 306), for example, to prevent radial forces on the motor drive shaft 305. That is, the first plurality of magnets 315 may be arranged symmetrically about the motor drive shaft rotational axis 306 and the second plurality of magnets 335 may be arranged symmetrically about the motor drive shaft rotational axis 306. A potential disadvantage of the magnets 315, 335 not being arranged symmetrically about the motor drive shaft 305 is that tangential linear force components from adjacent magnets may apply a radial force(s) (e.g., in the radial direction R and/or the transverse direction T) on the motor drive shaft 305.

Each of the first plurality of magnets 315 and the second plurality of magnets 335 may be disposed symmetrically about the motor drive shaft 305/motor drive shaft rotational axis 306. The first plurality of magnets 315 and the second plurality of magnets 335 may be located within the stationary ring 310 and the rotating disk 330, respectively, such that they are aligned with each other. For example, one magnet of the first plurality of magnets 315 may be radially aligned with one magnet of the second plurality of magnets 335 when the rotating disk 330 is received within the stationary ring 310. When the motor 301 is not operating, the second plurality of magnets 335 may be radially aligned with the first plurality of magnets 315.

The first and second plurality of magnets 315, 335 may be arranged such that a repelling force (e.g., in the radial direction R) is generated between the first plurality of magnets 315 and the second plurality of magnets 335. The repelling force may be generated by repulsion between the first plurality of magnets 315 and the second plurality of magnets 335. The repelling force may generate the holding torque on the motor drive shaft 305. The holding torque may be a braking force that maintains the motor drive shaft 305 in a fixed position (e.g., rotational position) when the motor 301 is not operating. The repelling force may also minimize (e.g., prevent) axial movement of the motor drive shaft 305 along the motor drive shaft rotational axis 306.

Poles of the first plurality of magnets 315 may be arranged in the opposite orientation or direction with respect to the motor drive shaft rotational axis 306 as the poles of the second plurality of magnets 335. Opposite poles of the first plurality of magnets 315 and the second plurality of magnets 335 may be adjacent (e.g., proximate) to one another when the rotating disk 330 is received within the stationary ring 310. Stated differently, north poles of the second plurality of magnets 335 may face toward north poles of the first plurality of magnets 315 and south poles of the second plurality of magnets 335 may face away from south poles of the first plurality of magnets 315. Alternatively, south poles of the second plurality of magnets 335 may face toward south poles of the first plurality of magnets 315 and north poles of the second plurality of magnets 335 may face away from south poles of the first plurality of magnets 315. The first plurality of magnets 315 may each be the same magnet (e.g., size, material, etc.). The second plurality of magnets 335 may each be the same magnet (e.g., size, material, etc.). The first plurality of magnets 315 may include the same or different magnets as the second plurality of magnets 335.

A holding torque profile of repelling magnets may be smoother (e.g., induce less vibration/oscillation) than a holding torque profile of attracting magnets such that starting motion and stopping motion of the motor 301 is smoother (e.g., induce less vibration/oscillation) when the magnets 315, 335 are arranged in a repelling position with respect to one another. The magnets 315, 335 arranged in the repelling position may enable a reduction in starting torque required from the motor 301 when compared to magnets arranged in an attracting position. For example, when the motor 301 is at rest, the second plurality of magnets 335 may be rotationally aligned with the first plurality of magnets 315 such that the holding torque of the magnetic brake 311 is at a maximum. Alternatively, when the motor 301 is at rest, the second plurality of magnets 335 may be misaligned (e.g., rotationally) with the first plurality of magnets 315, for example, because the first and second plurality of magnets 315, 335 are in a repelling position with respect to one another. In this configuration, when starting the motor 301 the motor drive shaft 305 may be reversed by approximately 45 degrees and then started (e.g., in the forward/starting direction). For example, the motor drive shaft 305 may be driven in a direction opposite of the desired direction (e.g., reversed) such that the second plurality of magnets 335 are located as far as possible (e.g., circumferentially) from the first plurality of magnets 315 (e.g., in between two adjacent magnets and/or approximately 45 degrees from each of the two adjacent magnets, when four magnets are used as shown). When the second plurality of magnets 335 are located as far as possible (e.g., circumferentially) from the first plurality of magnets 315, the repelling forces between the magnets 315, 335 and the holding torque may be at a minimum. When the second plurality of magnets 335 are located as far as possible (e.g., circumferentially) from the first plurality of magnets 315, the motor 301 may require a minimum amount of starting torque. When the second plurality of magnets 335 are located as far as possible (e.g., circumferentially) from the first plurality of magnets 315, the motor drive shaft 305 may be driven in the desired direction (e.g., forward). Here, inertia of the motor assembly 300 may be used to overcome the repelling forces and the holding torque.

It should be appreciated that the holding torque capability of the magnetic brake 311 may be based on a distance between the magnets (e.g., the first and second plurality of magnets 315, 335) in a rotational or radial direction (e.g., a radial direction R and/or a transverse direction T). For example, the closer the rotating magnets (e.g., the second plurality of magnets 335) are to the stationary magnets (e.g., the first plurality of magnets 315) within the magnetic brake 311 in the rotational direction, the stronger the holding torque capability of the magnetic brake 311 may be.

It should further be appreciated that when the motor 301 is not operating, the alignment between the first plurality of magnets 315 and the second plurality of magnets 335 within the magnetic brake 311 may vary (e.g., rotationally and/or circumferentially) based on a position of the flexible material attached to the roller tube. For example, the first plurality of magnets 315 and the second plurality of magnets 335 may be better aligned when the flexible material is in a lowered position (e.g., to apply a greater holding torque to the motor drive shaft 306). The first plurality of magnets 315 and the second plurality of magnets 335 may be more misaligned when the flexible material is in a raised position (e.g., to apply a lesser holding torque to the motor drive shaft 306).

The magnetic brake 311 may not generate heat (e.g., a significant amount of heat) in the motor assembly 300. For example, the magnetic brake 311 may not apply, or may minimize, a holding torque on the motor drive shaft 306 when the motor 301 is operating. The magnetic brake 311 may enable holding and/or starting torque adjustments. For example, a size and/or number of magnets 315, 335 may be changed to adjust an amount of holding torque applied by the magnetic brake 311 and/or an amount of starting torque required by the motor 301. As described herein, the magnet configuration of the magnetic brake 311 is not limited to a 4, 4 magnet configuration (e.g., four magnets—stationary ring 310, four magnets—rotating disk 330) as shown in FIG. 4. It should be appreciated that the magnet configuration of the magnetic brake 311 may have various magnet configurations, for example, such as 2, 4; 4, 2; 3, 3; 2, 2; 2, 6; 2, 8; 8, 2; 6, 2; 3, 6; 3, 12; 12, 3; 6, 12; 12, 6; 12, 12; 6, 6; and/or the like.

Figure 5:
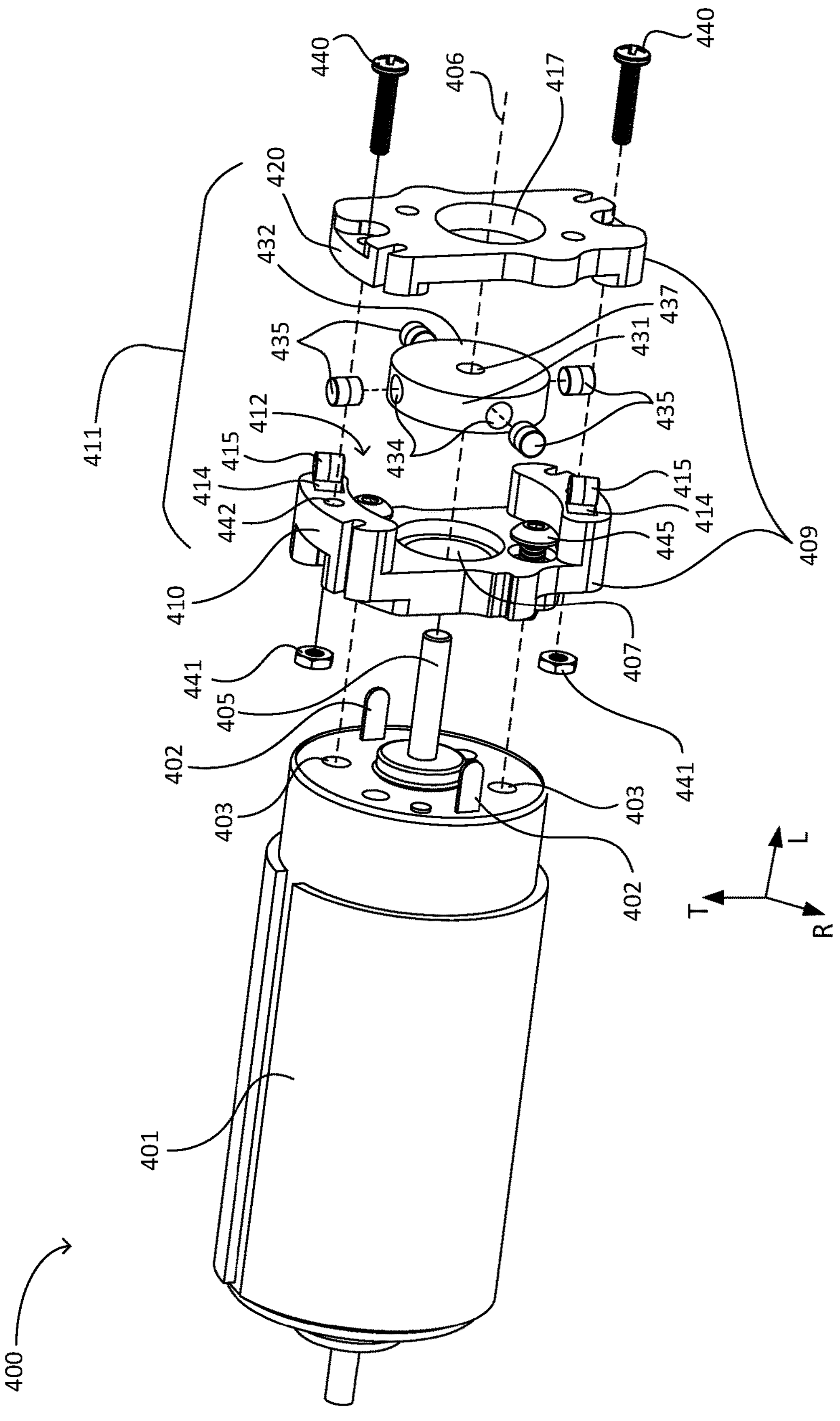
FIG. 5 is a partially exploded view of another example motor assembly for use in the example motorized window treatment shown in FIG. 1A.

FIG. 5 depicts an example motor assembly 400 configured for use with a motorized window treatment (e.g., such as the motorized window treatment 100 shown in FIG. 1A). For example, the motor assembly 400 may be used in a motor drive unit (e.g., motor drive unit 190 shown in FIG. 1B) of the motorized window treatment. The motor assembly 400 may include a motor 401 and a motor brake 411, also referred to herein as a magnetic brake 411. The motor 401 and the magnetic brake 411 may be configured to be located within a roller tube (e.g., roller tube 110) of the motorized window treatment (e.g., within a housing of the drive assembly). The motor 401 may include a motor drive shaft 405. The motor 401 may be configured to be operatively coupled to the roller tube, for example, via the motor drive shaft 405 and a gear assembly (e.g., such as gear assembly 198 shown in FIG. 1B). The motor drive shaft 405 may define a motor drive shaft rotational axis 406 in the longitudinal direction L. The motor drive shaft 405 may be configured to rotate the roller tube (e.g., through the gear assembly) to adjust a flexible material of the motorized window treatment between a raised position and a lowered position.

The magnetic brake 411 may be configured to stop and hold the motor 401 (e.g., the motor drive shaft 405) and the roller tube in place when the motorized window treatment is not being operated. For example, the magnetic brake 411 may be configured to prevent rotation of the motor drive shaft 405 when the motor 401 is not driving the motor drive shaft 405. The magnetic brake 411 may be operatively coupled to the motor drive shaft 405. That is, the motor drive shaft 405 may receive (e.g., carry) a portion of the magnetic brake 411. The magnetic brake 411 may include a plurality of magnets (e.g., magnets 415, 435). The magnets 415, 435 may be arranged in a repelling position within the magnetic brake 411. For example, the magnets 415, 435 may generate a holding torque that prevents the motor drive shaft 405 from rotating when the motor 401 is not driving the motor drive shaft 405. The holding torque may be generated by the repulsion (e.g., repelling forces) between adjacent magnets of the magnets 415, 435. The number of magnets 415, 435 may be configured based on the amount of holding torque required, a diameter of the magnets 415, 435, and/or a distance of the magnets 415, 435 from the motor drive shaft rotational axis 406. The holding torque required for the motor drive shaft 405 may vary based on a length of the roller tube, and a weight of the flexible material which may be based on a type of flexible material, and/or an amount of flexible material wound onto the roller tube. The magnets 415, 435 may be rare-earth magnets (e.g., such as neodymium magnets) or another type of strong permanent magnet.

The magnetic brake 411 may be an assembly that includes a stationary portion 409 and a rotating portion 430. The stationary portion 409 may be configured to enclose the rotating portion 430. Stated differently, the rotating portion 430 may be retained or located within the stationary portion 409. The stationary portion 409 may define a cavity 412 that receives and retains the rotating portion 430. The stationary portion 409 may remain stationary relative to the drive shaft 405. For example, the stationary portion 409 may be attached to the motor 401 and/or the motor drive unit housing. The rotating portion 430 may define a motor drive shaft aperture 437 that is configured to receive the motor drive shaft 405. The rotating portion 430 may be coupled to the motor drive shaft 405 (e.g., via the motor drive shaft aperture 437) such that the rotating portion 430 rotates with the motor drive shaft 405. For example, the rotating portion 430 may be press-fit onto the motor drive shaft 405. Additionally or alternatively, the rotating portion 430 may be splined onto the motor drive shaft 405. The stationary portion 409 may include a first plurality of magnets 415 (e.g., two magnets). The rotating portion 430 may include a second plurality of magnets 435 (e.g., four magnets).

The stationary portion 409 may include two members—a first stationary member 410 and a second stationary member 420. The first stationary member 410 may be proximate to the motor 401. For example, the first stationary member 410 may be attached to the motor 401. The second stationary member 420 may be distal from the motor 401. The first stationary member 410 may include or define a first aperture 407 configured to receive (e.g., and not contact) the motor drive shaft 405 and the second stationary member 420 may include or define a second aperture 417 configured to receive (e.g., and not contact) the motor drive shaft 405. The magnetic brake 411 may include fasteners (e.g., fasteners 440, 445). One or more fasteners 445 may be configured to secure the first stationary member 410 to the motor 401. For example, the fasteners 445 may be received by respective apertures 403 in the motor 401 to secure the stationary portion 409 to the motor 401. One or more fasteners 440 may be configured to secure the second stationary member 420 to the first stationary member 410. For example, the first stationary member 410 may include apertures 442 that are configured to receive the fasteners 440. The fasteners 440 may extend through the second stationary member 420 and through respective ones of the apertures 442 in the first stationary member 410. The fasteners 440 may be configured to receive a nut 441 on the motor side of the first stationary member 410. The nuts 441 and fasteners 440 may be configured to secure the first stationary member 410 to the second stationary member 420. The nuts 441 may be accessible when the first stationary member 410 is secured to the motor 401. The first and second stationary members 410, 420 may define the cavity 412, for example, when the second stationary member 420 is attached to the first stationary member 410. The motor 401 may include terminals 402 that extend from the motor 401 (e.g., towards the magnetic brake 411). For example, the terminals 402 may extend on either side of the magnetic brake 411 (e.g., the first stationary member 410) when the first stationary member

410 is secured to the motor 401. The terminals 402 may be accessible when the magnetic brake 411 is secured to the motor 401.

The first plurality of magnets 415 may be retained within (e.g., press-fit into) the first stationary member 410. The first stationary member 410 may define apertures 414 that are configured to receive the first plurality of magnets 415. The second plurality of magnets 435 may be retained within (e.g., press-fit into) the rotating portion 430. Each respective set of magnets 415, 435 may be arranged symmetrically about the motor drive shaft 405 (e.g., the motor drive shaft rotational axis 406), for example, to prevent radial forces on the motor drive shaft 405. That is, the first plurality of magnets 415 may be arranged symmetrically about the motor drive shaft rotational axis 406 and the second plurality of magnets 435 may be arranged symmetrically about the motor drive shaft rotational axis 406. A potential disadvantage of the magnets 415, 435 not being arranged symmetrically about the motor drive shaft 405 is that tangential linear force components from adjacent magnets may apply a radial force(s) (e.g., in the radial direction R and/or the transverse direction T) on the motor drive shaft 405.

Each of the first plurality of magnets 415 and the second plurality of magnets 435 may be disposed symmetrically about the motor drive shaft 405/motor drive shaft rotational axis 406. The first plurality of magnets 415 and the second plurality of magnets 435 may be located within the first stationary member 410 and the rotating portion 430, respectively, such that they are aligned with each other. For example, one magnet of the first plurality of magnets 415 may be radially aligned (e.g., in the radial direction R and/or transverse direction T) with one magnet of the second plurality of magnets 435 when the rotating portion 430 is received within the cavity 412. When the motor 401 is not operating, two of the second plurality of magnets 435 (e.g., that are separated by approximately 180 degrees) may be radially aligned with the first plurality of magnets 415.

The first and second plurality of magnets 415, 435 may be arranged such that a repelling force (e.g., in the radial direction R) is generated between the first plurality of magnets 415 and the second plurality of magnets 435. The repelling force may be generated by repulsion between the first plurality of magnets 415 and the second plurality of magnets 435. The repelling force may generate the holding torque on the motor drive shaft 405. The holding torque may be a braking force that maintains the motor drive shaft 405 in a fixed position (e.g., rotational position) when the motor 401 is not operating. The first and second repelling forces may also minimize (e.g., prevent) axial movement of the motor drive shaft 405 along the motor drive shaft rotational axis 406.

Poles of the first plurality of magnets 415 may be arranged in the opposite orientation or direction with respect to the motor drive shaft rotational axis 406 as the poles of the second plurality of magnets 435. Opposite poles of the first plurality of magnets 415 and the second plurality of magnets 435 may be adjacent (e.g., proximate) to one another when the rotating portion 430 is received within the stationary portion 409 (e.g., the cavity 412). Stated differently, north poles of the second plurality of magnets 435 may face toward north poles of the first plurality of magnets 415 and south poles of the second plurality of magnets 435 may face away from south poles of the first plurality of magnets 415. Alternatively, south poles of the second plurality of magnets 435 may face toward south poles of the first plurality of magnets 415 and north poles of the second plurality of magnets 435 may face away from north poles of the first plurality of magnets 415. The first plurality of magnets 415 may each be the same magnet (e.g., size, material, etc.). The second plurality of magnets 435 may each be the same magnet (e.g., size, material, etc.). The first plurality of magnets 415 may include the same or different magnets as the second plurality of magnets 435.

A holding torque profile of repelling magnets may be smoother (e.g., induce less vibration/oscillation) than a holding torque profile of attracting magnets such that starting motion and stopping motion of the motor 401 is smoother (e.g., induce less vibration/oscillation) when the magnets 415, 435 are arranged in a repelling position with respect to one another. The magnets 415, 435 arranged in the repelling position may enable a reduction in starting torque required from the motor 401 when compared to magnets arranged in an attracting position. For example, when the motor 401 is at rest, two of the second plurality of magnets 435 (e.g., that are separated by approximately 180 degrees) may be radially aligned with the first plurality of magnets 415 such that the holding torque of the magnetic brake 411 is at a maximum. Alternatively, when the motor 401 is at rest, the second plurality of magnets 435 may be misaligned (e.g., rotationally) with the first plurality of magnets 415, for example, because the first and second plurality of magnets 415, 435 are in a repelling position with respect to one another. In this configuration, when starting the motor 401 the motor drive shaft 405 may be reversed by approximately 45 degrees and then started (e.g., in the forward/starting direction). For example, the motor drive shaft 405 may be driven in a direction opposite of the desired direction (e.g., reversed) such that the second plurality of magnets 435 are located as far as possible (e.g., circumferentially) from the first plurality of magnets 415 (e.g., in between two adjacent magnets and/or approximately 45 degrees from each of the two adjacent magnets, when four magnets are used as shown). When the second plurality of magnets 435 are located as far as possible (e.g., circumferentially) from the first plurality of magnets 415, the repelling forces between the magnets 415, 435 and the holding torque may be at a minimum. When the second plurality of magnets 435 are located as far as possible (e.g., circumferentially) from the first plurality of magnets 415, the motor 401 may require a minimum amount of starting torque. When the second plurality of magnets 435 are located as far as possible (e.g., circumferentially) from the first plurality of magnets 415, the motor drive shaft 405 may be driven in the desired direction (e.g., forward). Here, inertia of the motor assembly 400 may be used to overcome the repelling forces and the holding torque.

It should be appreciated that the holding torque capability of the magnetic brake 411 may be based on a distance between the stationary magnets (e.g., the first plurality of magnets 415) and the rotating magnets (e.g., the second plurality of magnets 435) in a rotational or radial direction (e.g., the radial direction R and/or the transverse direction T). For example, the closer the rotating magnets (e.g., the second plurality of magnets 435) are to the stationary magnets (e.g., the first plurality of magnets 415) within the magnetic brake 411 in the rotational direction, the stronger the holding torque capability of the magnetic brake 411 may be.

It should further be appreciated that when the motor 401 is not operating, the alignment between the stationary magnets (e.g., the first plurality of magnets 415) and the rotating magnets (e.g., the second plurality of magnets 435) within the magnetic brake 411 may vary (e.g., rotationally and/or circumferentially) based on a position of the flexible material attached to the roller tube. For example, the first plurality of magnets 415 and the second plurality of magnets 435 may be better aligned when the flexible material is in a lowered position (e.g., to apply a greater holding torque to the motor drive shaft 406). The first plurality of magnets 415 and the second plurality of magnets 435) may be more misaligned when the flexible material is in a raised position (e.g., to apply a lesser holding torque to the motor drive shaft 406).

The magnetic brake 411 may not generate heat (e.g., a significant amount of heat) in the motor assembly 400. For example, the magnetic brake 411 may not apply, or may minimize, a holding torque on the motor drive shaft 406 when the motor 401 is operating. The magnetic brake 411 may enable holding and/or starting torque adjustments. For example, a size and/or number of magnets 415, 435 may be changed to adjust an amount of holding torque applied by the magnetic brake 411 and/or an amount of starting torque required by the motor 401. As described herein, the magnetic brake is not limited to a 2, 4 magnet configuration (e.g., two magnets—first stationary member 410, four magnets—rotating portion 430) as shown in FIG. 5. It should be appreciated that the magnet configuration of the magnetic brake 411 may have various magnet configurations, for example, such as 2, 4; 4, 2; 3, 3; 2, 2; 2, 6; 2, 8; 8, 2; 6, 2; 3, 6; 3, 12; 12, 3; 6, 12; 12, 6; 12, 12; 6, 6; and/or the like.

Figure 6:
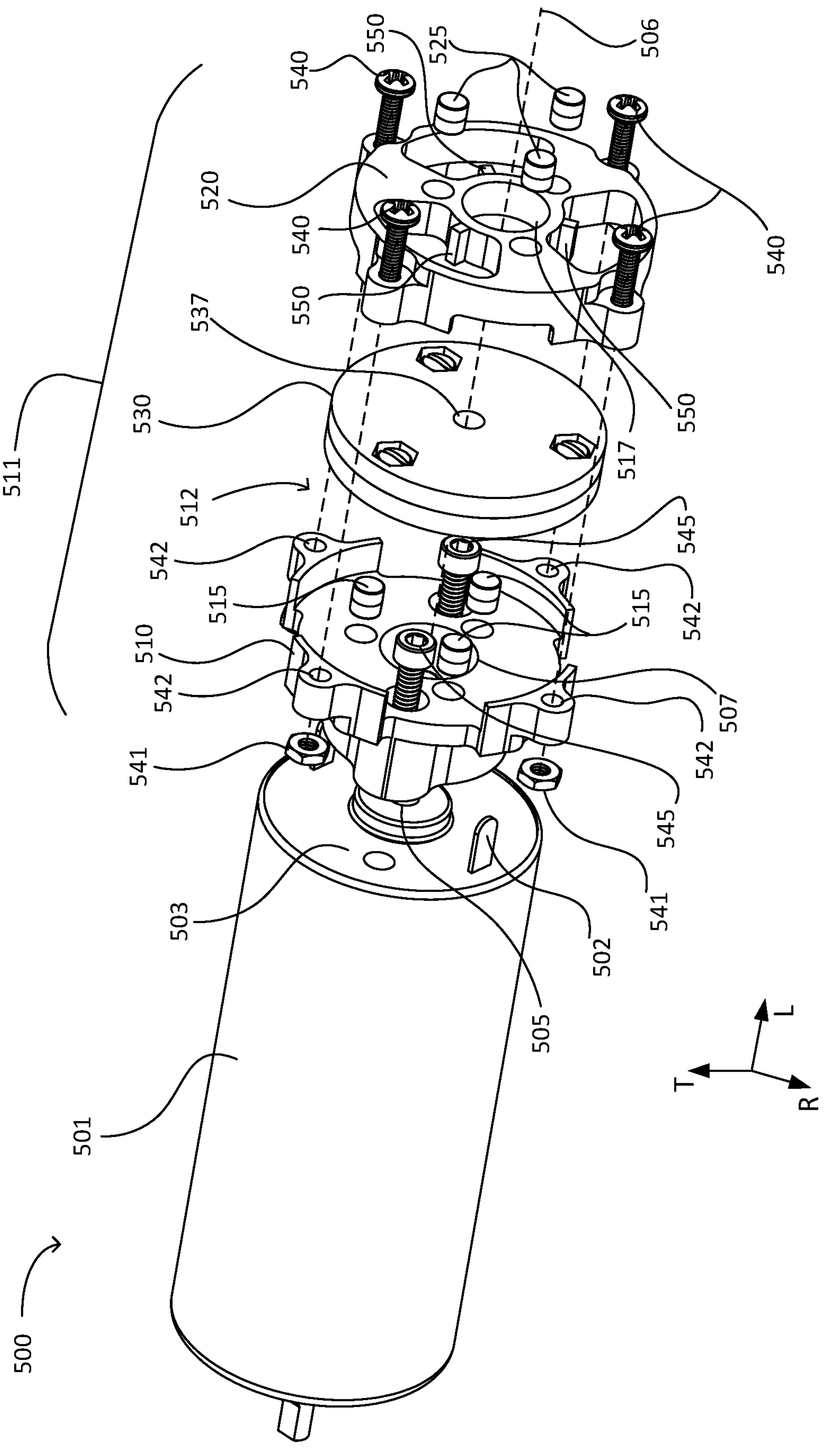
FIG. 6 is a partially exploded view of another example motor assembly for use in the example motorized window treatment shown in FIG. 1A.
Figure 7A:
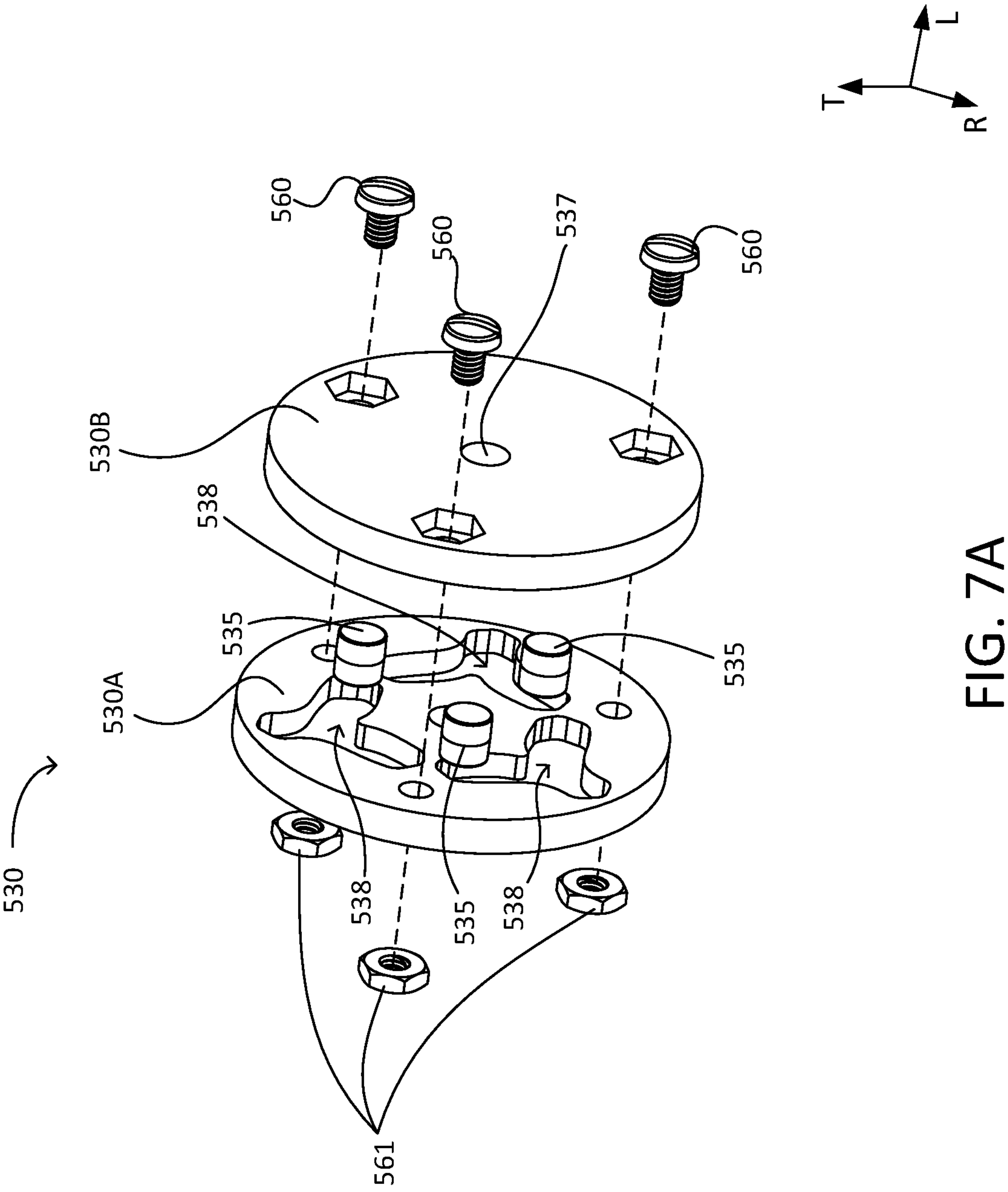
FIG. 7A is a partially exploded view of an example rotating portion of the example motor assembly shown in FIG. 6.
Figure 7C:
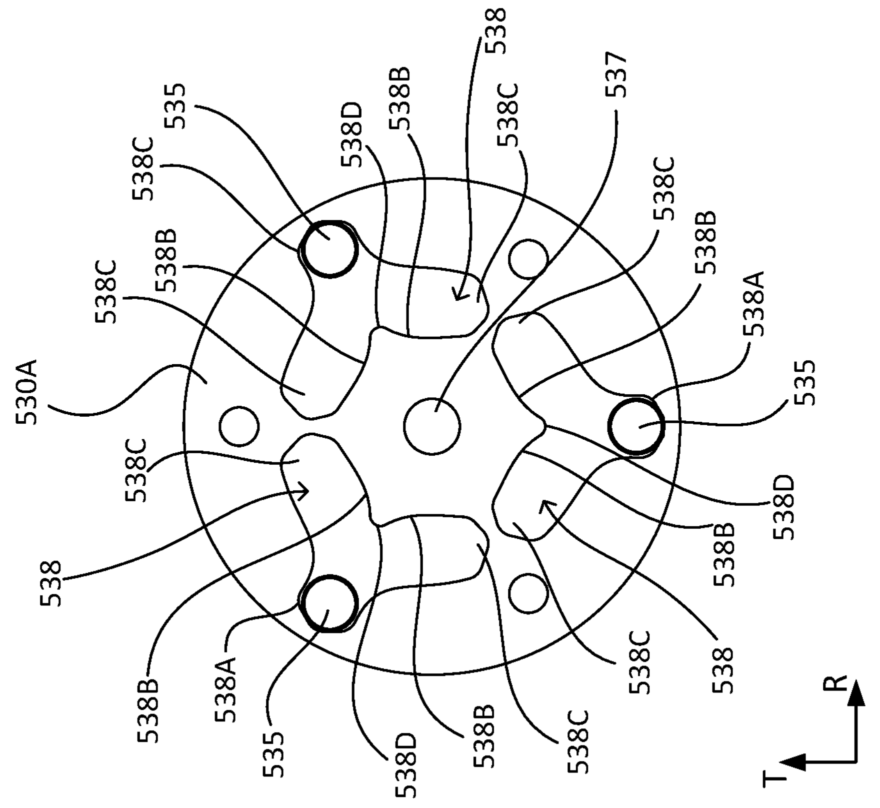
FIGS. 7B and 7C are each side views of a rotating disk of the example rotating portion shown in FIG. 7A.
Figure 7B:
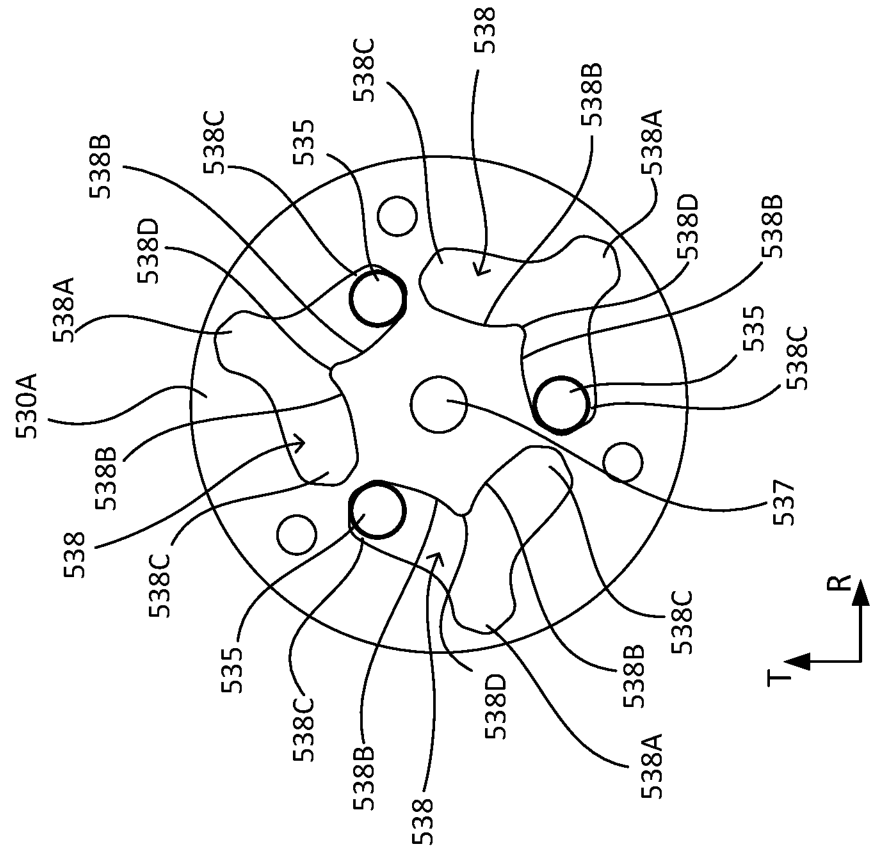
Figure 8A:
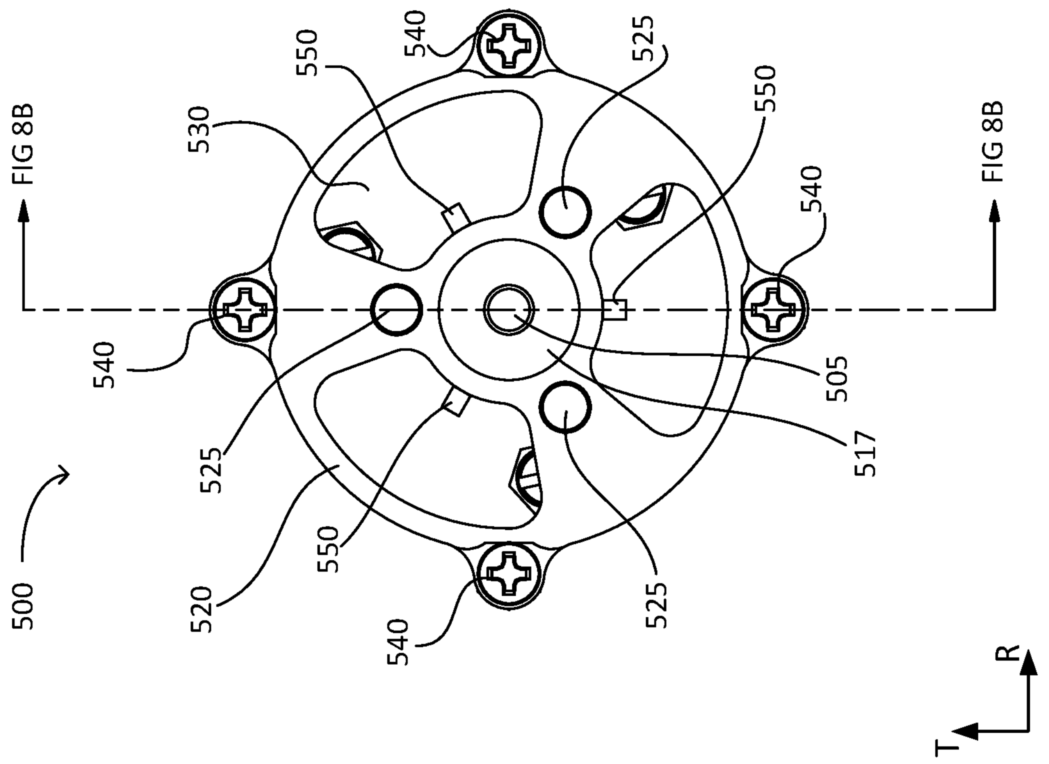
FIG. 8A is a side view of the example motor assembly shown in FIG. 6.
Figure 8B:
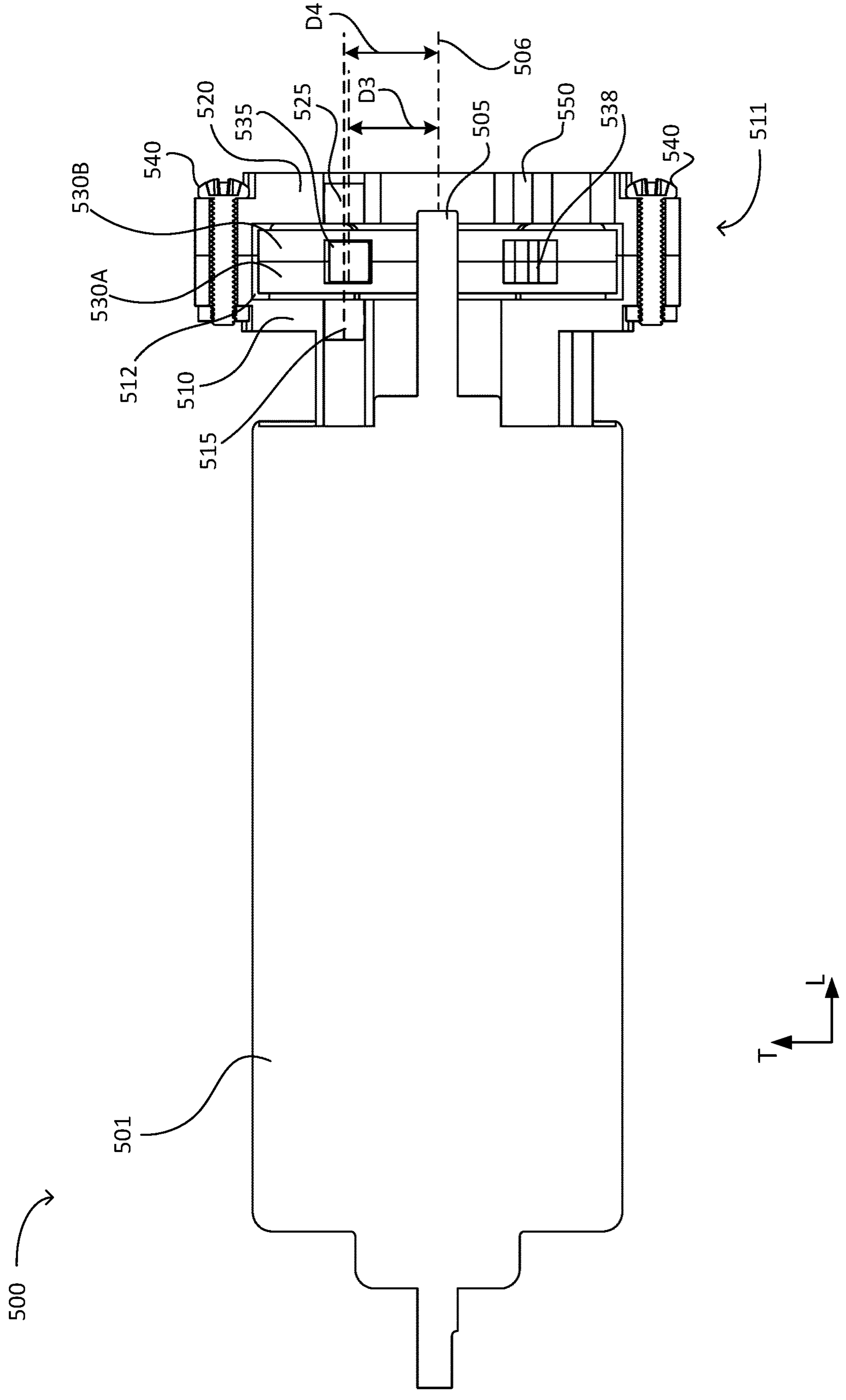
FIG. 8B is a cross-section view of the example motor assembly shown in FIG. 6.

FIGS. 6-8B depict another example motor assembly 500 configured for use with a motorized window treatment (e.g., such as the motorized window treatment 100 shown in FIG. 1A). The motor assembly 400 may include a motor 501 and a magnetic brake 511. The magnetic brake 511 may include a stationary portion 509, a rotating portion 530, and magnets 515, 525, 535. The stationary portion 509 may include a first stationary member 510 and a second stationary member 520. FIG. 6 is a partially exploded view of the motor assembly 500 showing magnets 515, 525 removed from stationary portions 510, 520. FIG. 7A is a partially exploded view of a rotating portion 530 of the motor assembly 500 showing magnets 535 removed from the slots 538. The rotating portion 530 may include rotating disks 530A, 530B, and the magnets 535. The rotating disk 530A may define slots 538. FIGS. 7B and 7C are side views of a rotating disk 530A of the rotating portion 530 showing magnets 535 in different positions in the slots 538. FIG. 8A is a side view of the motor assembly 500 at rest with the magnets 535 (e.g., hidden from view by second stationary member 520 and the rotating portion 530) substantially aligned with the magnets 525. FIG. 8B is a cross-section view of the motor assembly 500. For example, the motor assembly 500 may be used in a motor drive unit (e.g., such as motor drive unit 190 shown in FIG. 1B) of the motorized window treatment.

The motor assembly 500 may include a motor 501 (e.g., similar to the motor 201 shown in FIGS. 2 and 3) and a magnetic brake 511. The motor assembly 500 may be configured to be located within a drive assembly and within a roller tube of the motorized window treatment as similarly discussed for motor assembly 200. The motor 501 may include a motor drive shaft 505. The motor 501 may be configured to be operatively coupled to the roller tube, for example, via the motor drive shaft 505 and a gear assembly (e.g., such as the gear assembly 198 shown in FIG. 1B). The motor drive shaft 505 may define a motor drive shaft rotational axis 506 in the longitudinal direction L. The motor drive shaft 505 may be configured to rotate the roller tube (e.g., through the gear assembly) to adjust a flexible material of the motorized window treatment between a raised position and a lowered position.

The magnetic brake 511 may be configured to stop and hold the motor 501 (e.g., the motor drive shaft 505) and the roller tube in position when the motorized window treatment is not being operated. For example, the magnetic brake 511 may be configured to prevent rotation of the motor drive shaft 505 when the motor 501 is not driving the motor drive shaft 505. The magnetic brake 511 may be operatively coupled to the motor drive shaft 505. That is, the motor drive shaft 505 may receive (e.g., carry) a portion of the magnetic brake 511. The magnetic brake 511 may include a plurality of magnets (e.g., magnets 515, 525, 535). The magnets 515, 525, 535 may be arranged in a repelling position within the magnetic brake 511. For example, the magnets 515, 525, 535 may generate a holding torque that prevents the motor drive shaft 505 from rotating when the motor 501 is not driving the motor drive shaft 505. The holding torque may be generated by the repulsion (e.g., repelling forces) between adjacent magnets of the magnets 515, 525, 535. The number of magnets 515, 525, 535 may be configured based on the amount of holding torque required, a size of the magnets 515, 525, 535, a diameter of the magnets 515, 525, 535, and/or a distance of the magnets 515, 525, 535 from the motor drive shaft rotational axis 506. The holding torque required for the motor drive shaft 505 may vary based on a length of the roller tube, a type of flexible material, and/or an amount of flexible material wound onto the roller tube. The magnets 515, 525, 535 may be rare-earth magnets (e.g., such as neodymium magnets) or another type of strong permanent magnet.

The magnetic brake 511 may be an assembly that includes a stationary portion 509 and a rotating portion 530. The stationary portion 509 may be configured to enclose the rotating portion 530. Stated differently, the rotating portion 530 may be retained within the stationary portion 509. The stationary portion 509 may define a cavity 512 that receives the rotating portion 530. The rotating portion 530 may define a motor drive shaft aperture 537 that is configured to receive the motor drive shaft 505. The rotating portion 530 may be coupled to the motor drive shaft 505 (e.g., via the motor drive shaft aperture 537) such that the rotating portion 530 rotates with the motor drive shaft 505. For example, the rotating portion 530 may be press-fit onto the motor drive shaft 505. Additionally or alternatively, the rotating portion 530 may be splined onto the motor drive shaft 505. The stationary portion 509 may include one or more magnets (e.g., magnets 515, 525), for example, three each in this example. The rotating portion 530 may include one or more magnets 535 (e.g., three in this example).

The stationary portion 509 may include two members—a first stationary member 510 and a second stationary member 520. The first stationary member 510 may be proximate to the motor 501. For example, the first stationary member 510 may be attached to the motor 501. The second stationary member 520 may be distal from the motor 501. The first stationary member 510 may include a first aperture 507 configured to receive the motor drive shaft 505 and the second stationary member 520 may define a second aperture 517 configured to receive (e.g., and not contact) the motor drive shaft 505. The magnetic brake 511 may include fasteners (e.g., fasteners 540, 545, 560). One or more fasteners 545 may be configured to secure the first stationary member 510 to the motor 501. For example, the fasteners 545 may be received by respective apertures 503 in the motor 501 to secure the stationary portion 509 to the motor 501. One or more fasteners 540 may be configured to secure the second stationary member 520 to the first stationary member 510. For example, the first stationary member 510 may include apertures 542 that are configured to receive the fasteners 540. The fasteners 540 may extend through the second stationary member 520 and through respective ones of the apertures 542 in the first stationary member 510. The fasteners 540 may be configured to receive a nut 541 on the motor side of the first stationary member 510. The nuts 541 and fasteners 540 may be configured to secure the first stationary member 510 to the second stationary member 520. The nuts 541 may be accessible when the first stationary member 510 is secured to the motor 501. The first and second stationary members 510, 520 may define the cavity 512, for example, when the second stationary member 520 is attached to the first stationary member 510. The motor 501 may include terminals 502 that extend from the motor 501 (e.g., towards the magnetic brake 511). For example, the terminals 502 may extend on either side of the magnetic brake 511 (e.g., the first stationary member 510) when the first stationary member 510 is secured to the motor 501. The terminals 502 may be accessible when the magnetic brake 511 is secured to the motor 501.

The first stationary member 510 may include a first plurality of magnets 515. For example, the first plurality of magnets 515 may be retained within (e.g., press-fit into) the first stationary member 510. The second stationary member 520 may include a second plurality of magnets 525. For example, the second plurality of magnets 525 may be retained within (e.g., press-fit into) the second stationary member 520. The rotating portion 530 may include a third plurality of magnets 535. Each respective set of magnets 515, 525, 535 may be arranged symmetrically about the motor drive shaft 505 (e.g., the motor drive shaft rotational axis 506), for example, to prevent radial forces on the motor drive shaft 505. That is, the first plurality of magnets 515 may be arranged symmetrically about the motor drive shaft rotational axis 506, the second plurality of magnets 525 may be arranged symmetrically about the motor drive shaft rotational axis 506, and the third plurality of magnets 535 may be arranged symmetrically about the motor drive shaft rotational axis 506. A potential disadvantage of the magnets 515, 525, 535 not being arranged symmetrically about the motor drive shaft 505 is that tangential linear force components from adjacent magnets may apply a radial force(s) (e.g., in the radial direction R and/or the transverse direction T) on the motor drive shaft 505.

Each of the first plurality of magnets 515, the second plurality of magnets 525, and the third plurality of magnets 535 may be disposed symmetrically about the motor drive shaft 505. The first plurality of magnets 515 and the second plurality of magnets 525 may be located within the first stationary member 510 and the second stationary member 510, respectively, such that they are aligned with each other. For example, one magnet of the first plurality of magnets 515 may be laterally aligned with one magnet of the second plurality of magnets 525 and the other magnets of the first plurality of magnets 515 may be radially aligned with the other respective magnets of the second plurality of magnets 525. Each of the first plurality of magnets 515 and the second plurality of magnets 525 may be equally spaced about respective circles (e.g., approximately 120 degrees apart) centered on the motor drive shaft rotational axis 506. Each of the respective circles may have the same radius. When the motor 501 is not operating, each of the third plurality of magnets 535 (e.g., which may be separated by approximately 120 degrees) may be laterally aligned with the first and second plurality of magnets 515, 525.

The first and second plurality of magnets 515, 525 and the third plurality of magnets 535 may be arranged such that a first repelling force (e.g., in the longitudinal direction L) is generated between the first plurality of magnets 515 and the third plurality of magnets 535 and a second repelling force (e.g., in the longitudinal direction L) is generated between the second plurality of magnets 525 and the third plurality of magnets 535. The first repelling force may be generated by repulsion between the first plurality of magnets 515 and the third plurality of magnets 535. The first repelling force may be configured to repel the rotating portion 530 away from the motor 501. The second repelling force may be generated by repulsion between the second plurality of magnets 525 and the third plurality of magnets 535. The second repelling force may be configured to repel the rotating portion 530 toward the motor 501. The first repelling force and the second repelling force may generate the holding torque on the motor drive shaft 505. The holding torque may be a braking force that maintains the motor drive shaft 505 in a fixed position (e.g., rotational position) when the motor 501 is not operating. The first and second repelling forces may also minimize (e.g., prevent) axial movement of the motor drive shaft 505 along the motor drive shaft rotational axis 506.

The first repelling force and the second repelling force may be configured to locate the rotating portion 530 (e.g., in equilibrium) between the first rotating portion 510 and the second rotating portion 520. For example, the first repelling force may be substantially equal to the second repelling force. The first repelling force and the second repelling force may prevent the rotating portion 530 from contacting the first stationary member 510 and/or the second stationary member 520, for example, when the motor 501 is operating and/or when the motor 501 is not operating. For example, the rotating portion 530 may be centered between the first stationary portion 510 and the second stationary portion 520 by the first repelling force and the second repelling force.

The first plurality of magnets 515 may be arranged (e.g., within the first stationary portion 510) in the same orientation which the second plurality of magnets 525 are arranged (e.g., within the second stationary portion 520). Opposite poles of the first plurality of magnets 515 and the second plurality of magnets 525 may be adjacent (e.g., proximate) to the rotating portion 530 (e.g., the third plurality of magnets 535). For example, common or like poles of the first and second plurality of magnets 515, 525 may be adjacent to the third plurality of magnets 535. Stated differently, north poles of the third plurality of magnets 535 may face north poles of the first plurality of magnets 515 and south poles of the third plurality of magnets 535 may face south poles of the second plurality of magnets 525. Alternatively south poles of the third plurality of magnets 535 may face south poles of the first plurality of magnets 515 and north poles of the third plurality of magnets 535 may face north poles of the second plurality of magnets 525. The first plurality of magnets 415 may each be the same magnet (e.g., size, material, etc.). The second plurality of magnets 425 may each be the same magnet (e.g., size, material, etc.). The third plurality of magnets 435 may each be the same magnet (e.g., size, material, etc.). The first plurality of magnets 415 may include the same magnets as the second plurality of magnets 425. The third plurality of magnets 435 may include the same or different magnets than the first plurality of magnets 415 and/or the second plurality of magnets 425.

The rotating portion 530 may include multiple pieces. For example, the rotating portion 530 may include a first rotating disk 530A and a second rotating disk 530B. The first rotating disk 530A and the second rotating disk 530B may be configured to retain the third plurality of magnets 535. For example, the rotating portion 530 may define a plurality of slots 538 (e.g., three in this example). For example, the first rotating disk 530A may define the plurality of slots 538. Additionally or alternatively, the second rotating disk 530B may define another plurality of slots (not shown). Although FIG. 7A shows the third plurality of magnets 535 removed from the plurality of slots 538, it should be appreciated that each of the plurality of slots 538 may receive a respective one of the third plurality of magnets 535. The first rotating disk 530A and the second rotating disk 530B may be held together by fasteners 560 and nuts 561. Although fasteners 540, 545, 560 are depicted as screws, for example, it should be appreciated that other fasteners such as clips, snaps, adhesive materials, etc., may be used to attach first and second stationary members 510, 520, attach the first and second rotating disks 530A, 530B, and/or attach the first stationary member 510 to the motor 501.

FIG. 7B depicts the rotating disk 530A when the motor 501 is at rest (e.g., not driving the motor drive shaft 505). FIG. 7C depicts the first rotating disk 530A when the motor 501 is operating. The plurality of slots 538 may extend into (e.g., partially into and not through) the rotating disk 530A. Again, rotating disk 530B may include a matching set of slots 538. The plurality of slots 538 may be configured to enable movement of the third plurality of magnets 535 within the rotating portion 530, for example, as the motor 501 transitions between operation and being at rest. For example, each of the plurality of slots may be y-shaped (e.g., forked) and may define an inner portion 538B, an outer portion 538A, and two side portions 538C. Each of the plurality of slots 538 may define a crown 538D located along the inner portion 538B between the side portions 538C. The crown 538D may be a hump on the inner portion 538B located proximate to (e.g., at) a midpoint between the side portions 538C. The inner portion 538B may be configured to be proximate to the motor drive shaft 505. For example, the inner portion 538B may be defined as the inner edge of the slots 538 between the side portions 538C. The outer portion 538A may be distal from the motor drive shaft 505. For example, the outer portion 538A may be an outermost position of the slots 538. Each of the plurality of slots 538 may be arranged such that the outer portion 538A is radially aligned with the crown 538D. The side portions 538C may define the innermost positions of the slots 538.

As shown in FIG. 7B, the plurality of slots 538 may be configured to enable the third plurality of magnets 535 to be in a first position proximate to the motor drive shaft 505, for example, when the motor drive shaft 505 is not rotating. The first position may be defined as proximate to one of the side portions 538C. When the motor drive shaft 505 begins rotating (e.g., slowly), the third plurality of magnets 535 may be pushed from the side portions 538C by the first and second plurality of magnets 515, 525 along the inner portion 538B toward the crown 538D of the plurality of slots 538. As the motor drive shaft 505 continues rotating, the third plurality of magnets 535 at the inner portion 538B proximate to the crown 538D may be forced (e.g., by respective first and second plurality of magnets 515, 525) to a second position distal from the motor drive shaft 505. The second position may be defined as proximate to the outer portion 538A as shown in FIG. 7C. For example, the second position may be a farthest outermost position along the outer portion 538A from the motor drive shaft 505. The third plurality of magnets 535 may be configured to move between the outer portion 538A and the inner portion 538B, for example, as the motor 501 transitions between operating (e.g., rotating the motor drive shaft 505) and not operating (e.g., ceasing rotation of the motor drive shaft 505). The third plurality of magnets 535 may be located in the outer portion 538A when the magnetic brake 511 is disengaged (e.g., when the motor 501 is operating). The third plurality of magnets 535 may be located in one of the side portions 538C when the magnetic brake 511 is engaged (e.g., when the motor 501 is not operating). The third plurality of magnets 535 may be further from the motor drive shaft 505 when located in the outer portion 538A when compared to when they are located in the side portions 538C.

When the motor 501 is at rest, respective circles formed by the first plurality of magnets 515, the second plurality of magnets 525, and the third plurality of magnets 535 may be concentric (e.g., about the motor drive shaft rotational axis 506). The circle formed by the third plurality of magnets 535 in the side portion 538C may define a circumference that is different from a circumference defined by the circle formed by the first plurality of magnets 515 and/or the second plurality of magnets 525. For example, the third plurality of magnets 535 (e.g., a rotational circumference defined by the third plurality of magnets 535) in the side portion 538C may be spaced a first distance (or radius) D3 from the motor drive shaft rotational axis 506 and the first and second plurality of magnets 515, 525 (e.g., a rotational circumference defined by the first and second plurality of magnets 515, 525) may be spaced a second distance (or radius) D4 from the motor drive shaft rotational axis 506. The first distance D3 may be different than the second distance D4. Stated differently, the circumference defined by the third plurality of magnets 535 in the side portion 538C may have a radius equal to the first distance D3 and the circumference defined by the first and second plurality of magnets 515, 525 may have a radius equal to the second distance D4. When the first distance D3 does not equal D4 a level of oscillation of the motor drive shaft 505 (e.g., in a direction perpendicular to the longitudinal direction L) may be reduced compared to if the distance D3 equals the distance D4, similar to the offset between distances D1 and D2 described in FIG. 3. For example, the first distance D3 may be greater than the second distance D4. The first distance D3 may vary based on the position of the respective third plurality of magnets 535 in the slots 538. For example, the first distance D3 may be maximum when the third plurality of magnets 535 are located in the outer portions 538A.

The magnetic brake 511 (e.g., the second stationary portion 520) may include ferrite material 550. The ferrite material 550 may be configured to pull the third plurality of magnets 535 inward towards the inner portion 538B (e.g., the crown 538D) as the motor drive shaft 505 slows down and/or the motor 501 stops operating, for example, to better align the third plurality of magnets 535 with the first and second plurality of magnets 515, 525. The ferrite material 550 may be formed as projections with each projection aligned with a respective crown 538D of the plurality of slots 538. For example, the ferrite material 550 may be located within the second stationary portion 520 about a circumference defined by the inner portion 538B of the plurality of slots 538. Alternatively, the ferrite material 550 may be located on the first stationary portion 510. There may be one projection of ferrite material 550 for each of the plurality of slots 538. As the motor 501 slows or stops operating, the third plurality of magnets may move (e.g., drop) toward the inner portion 538B (e.g., the crown 538D) due (at least in part) to the ferrite material 550. As the motor drive shaft 505 continues rotating, the third plurality of magnets 535 may become forced into one of the side portions 538C (e.g., depending on the direction of rotation)

and may align (e.g., rotationally align) with respective magnets of the first and second plurality of magnets 515, 525 to provide a holding torque as the motor 501 stops. For example, the third plurality of magnets 535 may move into one of the side portions 538C when the motor drive shaft 505 is rotating clockwise and into the other one of the side portions 538C when the motor drive shaft 505 is rotating counter-clockwise. Stated differently, the third plurality of magnets 535 may move into one of the side portions 538C based on whether the motor 501 is raising or lowering the covering material.

The plurality of slots 538 may be configured to reduce torque fluctuation while the motor 501 is operating. The plurality of slots 538 may be configured to enable a lower starting torque (e.g., than if the third plurality of magnets 535 were in a fixed position within the rotating portion 530) when the motor 501 is operated in the same direction as the brake torque (e.g., the brake hold direction). For example, a gravitational torque (e.g., from a weight of a lowered covering material) may be applied to the motor drive shaft 505 when the motor 501 is at rest. The magnetic brake 511 may apply the brake torque in the opposite direction of the gravitational torque. The opposite rotational direction of the gravitational torque may be defined as the brake hold direction. For example, the motor drive shaft 505 may be reversed (e.g., the covering material slightly lowered) before operation of the motor 501 to raise the covering material such that the third plurality of magnets 535 are forced from the side portion 538C towards the crown 538D, for example, when the motor 501 operated in the same direction as the brake torque (e.g., opposite the gravitational torque). In examples, the motor 501 may be operated to slightly lower a window covering before reversing direction to raise it (e.g., the magnets move to position 538A of the slots 538 to not impede rotation of the motor 501).

When the third plurality of magnets 535 are in the outer portion 538A, the third plurality of magnets 535 may be far enough away from the first and second plurality of magnets 515, 525 that the motor drive shaft 505 can rotate without significant (e.g., reduced) repelling forces between the magnets 515, 525, 535. When the motor drive shaft 505 rotates slowly, the third plurality of magnets 535 may not reach the outer portion 538A. For example, the third plurality of magnets 535 may move over toward the crown 538D on the inner portion 538B when the motor drive shaft 505 rotates slowly; but, the third plurality of magnets 535 may not reach the outer portion 538A. When desiring to move the motor 501 in the brake hold direction, the motor drive shaft 505 may be first reversed (e.g., in the opposite direction of the brake hold direction) before starting the motor 501 in the brake hold direction. The reverse motion may be configured such that the magnetic brake 511 engages in the reverse direction (e.g., the opposite direction from the brake hold direction). Stated differently, when the motor 501 is reversed prior to starting/moving in the brake hold direction, the third plurality of magnets 535 may be pushed to the opposite side portions 538C from when the motor 501 was at rest. As the motor 501 speeds up and the rotating portion 530 spins more quickly, the third plurality of magnets 535 may be accelerated toward the outer portion 538A by repelling forces between the magnets 515, 525, 535, for example, such that centripetal force pushes the third plurality of magnets 535 from the side portion 538C to the outer portion 538A. Maximum acceleration of the rotating portion 530 may result when the magnetic brake 511 disengages, e.g., the repelling forces between the magnets 535 of the rotating portion 530 and the magnets 515, 525 of the stationary portion (and thereby the holding torque) may be reduced when the magnets 535 move to outer portion 538A.

When desiring to move the motor 501 in an opposite direction to the brake hold direction (e.g., lower the shade), centripetal force may push the third plurality of magnets 535 to the outer portion 538A (e.g., without having to reverse the motor drive shaft 505 first). In this lowering direction, the magnets 515, 525 may initially assist the acceleration of the rotating portion 530 and the third plurality of magnets 535. Centripetal force on the third plurality of magnets 535 may move them out to the outer portion 538A. When the third plurality of magnets 535 are in the outer portion 538A, the third plurality of magnets 535 may pass the stationary magnets (e.g., the first and second plurality of magnets 515, 525) farther out from the drive shaft rotational axis 506, for example, which results in less resistance (e.g., for starting) from repelling forces created between the magnets 515, 525, 535.

The third plurality of magnets 535 may be held in the outer portion 538A of the plurality of slots 538 while the motor 501 is operating, for example, by a shape of the magnetic field and/or changing impulses of the magnets 515, 525, 535. As the motor 501 slows to a stop, the third plurality of magnets 535 may move toward the inner portion 538B (e.g., the crown 538D). The ferrite material 550 may assist (e.g., attract) the third plurality of magnets 535 as they move toward the inner portion 538B. As the third plurality of magnets 535 approach the inner portion 538B, the first and second plurality of magnets 515, 525 (e.g., repelling forces associated with the first and second plurality of magnets 515, 525) may push the third plurality of magnets 535 toward one of the side portions 538C until the third plurality of magnets 535 are laterally offset from the first and second plurality of magnets 515, 525. The third plurality of magnets 535 may be located in one of the side portions 538C when they are laterally aligned with the first and second plurality of magnets 515, 525. The holding torque may hold the motor drive shaft 505 (e.g., prevent the motor drive shaft 505 from rotating) when the third plurality of magnets 535 are aligned with the first and second plurality of magnets 515, 525 (e.g., in the side portion 538C). When the motor 501 begins operating, the third plurality of magnets 535 may be pushed (e.g., by a centripetal force generated by rotation of the motor 501) to the outer portion 538A, for example, to reduce vibrations in the motor drive shaft 505 and/or improve acoustic noise performance of the motor assembly 500.

The magnets 515, 525, 535 arranged in a repelling position may enable a reduction in starting torque required from the motor 501. For example, the motor drive shaft 505 may be driven (e.g., reversed) such that the third plurality of magnets 535 are located as far as possible (e.g., circumferentially) from the first and second plurality of magnets 515, 525. When the third plurality of magnets 535 are located as far as possible (e.g., circumferentially) from the first and second plurality of magnets 515, 525, the repelling forces between the magnets 515, 525, 535 and the holding torque may be at a minimum. When the third plurality of magnets 535 are located as far as possible (e.g., circumferentially) from the first and second plurality of magnets 515, 525, the motor 501 may require a minimum amount of starting torque. When the third plurality of magnets 535 are located as far as possible (e.g., circumferentially) from the first and second plurality of magnets 515, 525, inertia of the motor assembly 500 and/or the gravitational torque applied to the motor drive shaft 505 may be used to overcome the repelling forces and the holding torque.

It should be appreciated that the holding torque capability of the magnetic brake 511 may be related to a distance between the stationary magnets (e.g., the first and second plurality of magnets 515, 525) and the rotating magnets (e.g., the third plurality of magnets 535) in the longitudinal direction L. For example, the closer the rotating magnets (e.g., the third plurality of magnets 535) are to the stationary magnets (e.g., the first and second plurality of magnets 515, 525) within the magnetic brake 511 in the longitudinal direction L, the stronger the holding torque capability of the magnetic brake 511 may be. The distance between the stationary magnets (e.g., the first and second plurality of magnets 515, 525) and the rotating magnets (e.g., the third plurality of magnets 535) in the longitudinal direction L may be adjusted based on a size and/or shape of the first stationary member 510 and/or the second stationary member 520. It should be appreciated that the holding torque capability of the magnetic brake 511 may be based on a distance between the stationary magnets (e.g., the first and second plurality of magnets 515, 525) and the rotating magnets (e.g., the third plurality of magnets 535). For example, the closer the rotating magnets (e.g., the third plurality of magnets 535) are to the stationary magnets (e.g., the first and second plurality of magnets 515, 525) within the magnetic brake 511, the stronger the holding torque capability of the magnetic brake 511 may be.

It should further be appreciated that rotational alignment between the stationary magnets (e.g., the first and second plurality of magnets 515, 525) and the rotating magnets (e.g., the third plurality of magnets 535) within the magnetic brake 511 may vary (e.g., along the rotational direction) based on a position of the flexible material attached to the roller tube. For example, the stationary magnets (e.g., the first and second plurality of magnets 515, 525) and the rotating magnets (e.g., the third plurality of magnets 535) may be more closely aligned (e.g., rotationally aligned) when the flexible material is in a lowered position (e.g., to apply a greater holding torque to the motor drive shaft 505). The stationary magnets (e.g., the first and second plurality of magnets 515, 525) and the rotating magnets (e.g., the third plurality of magnets 535) may be less aligned (e.g., rotationally aligned) when the flexible material is in a raised position (e.g., to apply a lesser holding torque to the motor drive shaft 505).

The magnetic brake 511 may not generate heat (e.g., a significant amount of heat) in the motor assembly 500, as compared to other types of mechanical motor brakes, for example. For example, the magnetic brake 511 may not apply, or may minimize, a holding torque on the motor drive shaft 505 when the motor 501 is operating. The magnetic brake 511 may enable holding and/or starting torque adjustments. For example, a size and/or shape of the slots 538 may be adjusted to adjust an amount of holding torque applied by the magnetic brake 511 and/or an amount of starting torque required by the motor 501. Additionally or alternatively, a size and/or number of magnets 515, 525, 535 may be changed to adjust an amount of holding torque applied by the magnetic brake 511 and/or an amount of starting torque required by the motor 501.

Although the embodiments shown herein depict stationary magnets and rotating magnets in 2/4/2 (e.g., 2 stationary magnets, 4 rotating magnets, and 2 stationary magnets) and 3/3/3 (e.g., 3 stationary magnets, 3 rotating magnets, 3 stationary magnets) configurations, one of ordinary skill in the art will understand that other combinations of magnets may alternatively be used. For example, in designing a magnetic brake system, the number of rotating and stationary magnets on each portion may either be equal, or may be multiples of the smallest number of magnets, in order to maintain symmetry. That is, alternate magnetic brake designs may have a ratio of stationary to rotating magnets of 1:1, 1:2, 1:3, etc., or, conversely, a 2:1 or 3:1 ratio (e.g., as the smaller number of magnets can be on either the rotating or the stationary portions). Further, the number of magnets on each stationary portion do not need to be equal. For example, configurations of stationary magnets/rotating magnets/stationary magnets such as 2/2/2, 4/4/4, 2/6/2/2/8/2, 8/2/8, 3/6/3, 3/12/3, 12/3/12, etc., may also be used. Additionally, as described previously, the number of magnets and/or the ratio of rotating magnets to stationary magnets may affect the holding torque of the magnetic brake. For example, a magnetic brake having a 6/12/6 design (e.g., 6 stationary magnets, 12 rotating magnets, 6 stationary magnets) may have approximately half the holding torque (e.g., braking ability) of a 12/12/12 design (e.g., 12 stationary magnets, 12 rotating magnets, 12 stationary magnets).

Although the embodiments herein describe the motor (e.g., such as the motor 201 shown in FIGS. 2-3, the motor 301 shown in FIG. 4, the motor 401 shown in FIG. 5, and/or the motor 501 shown in FIGS. 6 and 8B) as remaining stationary as the motor drive shaft (e.g., such as the motor drive shaft 205 shown in FIGS. 2-3, the motor drive shaft 305 shown in FIG. 4, the motor drive shaft 405 shown in FIG. 5, and/or the motor drive shaft 505 shown in FIGS. 6, 8A, and 8B) rotates, it should be appreciated that the motor drive shaft may remain stationary and the motor (e.g., the motor housing) may rotate. In this example, the stationary portion (e.g., the stationary portion 209 shown in FIGS. 2-3, the stationary ring 310 shown in FIG. 4, the stationary portion 409 shown in FIG. 5, and/or the stationary portion 509) of the magnetic brake may rotate with the motor/motor housing and the rotating portion (e.g., the rotating portion 230 shown in FIGS. 2-3, the rotating disk 330 shown in FIG. 4, the rotating portion 430 shown in FIG. 5, and/or the rotating portion 530 shown in FIGS. 6 and 8B) of the magnetic brake may remain stationary with the motor drive shaft.

Although the embodiments herein describe the magnetic brake 211, 311, 411, 511 as being coupled to the respective motor drive shaft 205, 305, 405, 505. It should be appreciated that the magnetic brake could be incorporated elsewhere in the motor drive unit. For example, the magnetic brake may be integrated into the gear assembly (e.g., such as gear assembly 198 shown in FIG. 1B). In this example, one or more gears, shafts, and/or housings of the gear assembly may include magnet(s) in repelling configuration.

Figure 9:
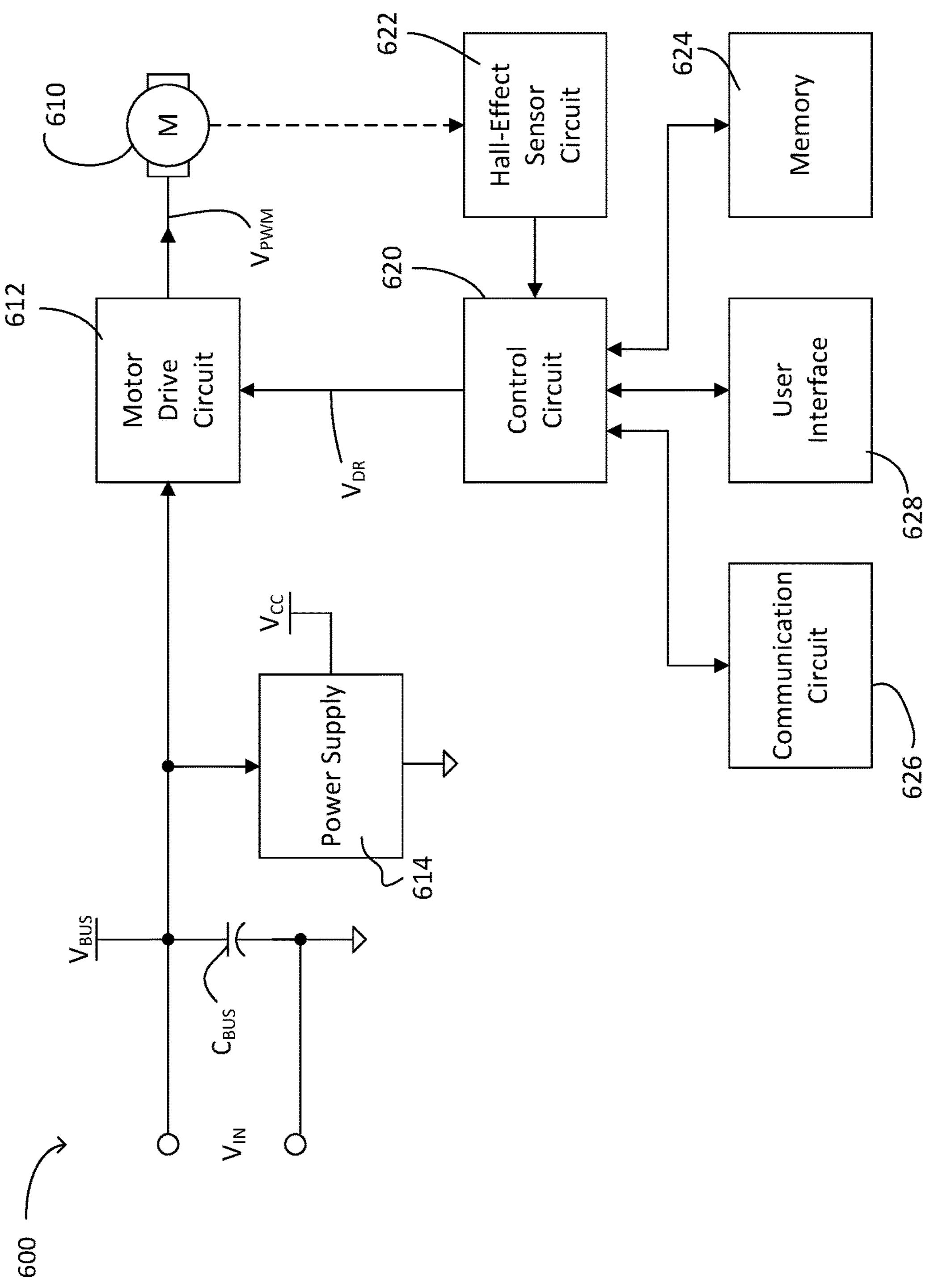
FIG. 9 is a simplified block diagram of an example motor drive unit for use with the motorized window treatment shown in FIG. 1A.

FIG. 9 is a simplified block diagram of a motor drive unit 600 of a motorized window treatment (e.g., the drive assembly of the motorized window treatment 100). The motor drive unit 600 may include a motor 610 (e.g., such as motor 201 shown in FIGS. 2-3, the motor 301 shown in FIG. 4, the motor 401 shown in FIG. 5, and/or the motor 501 shown in FIGS. 6 and 8B) that may be coupled to a roller tube of the motorized window treatment (e.g., the roller tube 110) for rotating the roller tube. The motor 610 may be a direct-current motor. The motor 610 may be a motor assembly (e.g., such as the motor assembly 200 shown in FIGS. 2-3, the motor assembly 300 shown in FIG. 4, the motor assembly 400 shown in FIG. 5, and/or the motor assembly 500 shown in FIGS. 6-8B). Rotation of the roller tube may be configured to raise and lower a covering material (e.g., the flexible material 120 shown in FIG. 1A). The motor drive unit 600 may include a motor drive circuit 612 (e.g., an H-bridge drive circuit) that receives a bus voltage $V_{BUS}$ and may generate a pulse-width modulated (PWM) voltage for driving the motor 610. The bus voltage $V_{BUS}$ may be produced across a bus capacitor $C_{BUS}$. The motor drive unit 600 may include a power supply 614 that may receive the bus voltage $V_{BUS}$ and generate a supply voltage $V_{CC}$ for powering the low-voltage circuitry of the motor drive unit. The motor drive unit 600 may be configured to receive an input voltage VIN from, for example, an external power supply, such as a direct-current (DC) supply and/or an alternating-current (AC) supply. Additionally or alternatively, the motor drive unit 600 may be powered by one or more batteries and/or a photovoltaic power source, such as a solar cell.

The motor drive unit 600 may include a control circuit 620 for controlling the operation of the motor 610. The control circuit 620 may include, for example, a microprocessor, a programmable logic device (PLD), a microcontroller, an application specific integrated circuit (ASIC), a field-programmable gate array (FPGA), or any suitable processing device or control circuit. The control circuit 620 may be configured to generate one or more drive signals $V_{DR}$ for controlling the motor drive circuit 612. The one or more drive signals $V_{DR}$ may be configured to control the rotational speed and/or direction of rotation of the motor 610.

The motor drive unit 600 may include a rotational position sensor, such as, for example, a Hall effect sensor (HES) circuit 622, which may be configured to generate one or more Hall effect sensor signals $V_{HES}$. The one or more Hall effect sensor signals $V_{HES}$ may indicate a rotational speed and/or a direction of the motor 610 to the microcontroller. The rotational position sensor may include other suitable position sensors, such as, for example, magnetic, optical, and/or resistive sensors. The control circuit 620 may be configured to determine a rotational position of the motor 610 in response to the Hall effect sensor signals $V_{HES}$ generated by the HES circuit 622. The control circuit 620 may be configured to determine a present position of the covering material in response to the rotational position of the motor 610. The control circuit 620 may be coupled to a memory 624 (e.g., a non-volatile memory). The present position of the covering material and/or limits for controlling the position of the covering material (e.g., a fully open position and/or a fully closed position) may be stored in the memory 624. The operation of a motor drive circuit and a Hall effect sensor circuit of an example motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 600 may include a communication circuit 626 that may allow the control circuit 620 to transmit and receive communication signals, e.g., wired communication signals and/or wireless communication signals, such as radio-frequency (RF) signals. The motor drive unit 600 may include a user interface 628 having one or more buttons that allow a user to provide inputs to the control circuit 620 during setup and/or configuration of the motorized window treatment. The control circuit 620 may be configured to control the motor 610 to control the movement of the covering material in response to a shade movement command received from the communication signals received via the communication circuit 626 or the user inputs via the buttons of the user interface 628. The user interface 628 may include one or more light-emitting diodes (LEDs) that may be illuminated by the control circuit 620, for example, to provide feedback to the user of the motorized window treatment.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A motorized window treatment comprising:
a roller tube;
a flexible material that is attached to the roller tube;
a motor configured to be located within the roller tube, the motor comprising a motor drive shaft defining a motor drive shaft rotational axis in a longitudinal direction, the motor drive shaft configured to rotate the roller tube to adjust the flexible material between a raised position and a lowered position; and
a magnetic brake operatively coupled to the motor drive shaft, the magnetic brake comprising:
a stationary portion comprising a first stationary member, a second stationary member, and a first plurality of magnets, the first stationary member attached to the second stationary member to define a cavity, wherein the first stationary member comprises one or more of the first plurality of magnets and the second stationary member comprises one or more of the first plurality of magnets; and
a rotating portion comprising a second plurality of magnets, the rotating portion retained within the cavity defined by the attachment of the first stationary member and the second stationary member,
wherein the first plurality of magnets are configured to repel the second plurality of magnets such that repulsion between the first plurality of magnets and the second plurality of magnets generates a holding torque that prevents the motor drive shaft from rotating when the motor is not driving the motor drive shaft.

2. The motorized window treatment of claim 1, wherein the rotating portion is coupled to the motor drive shaft such that the rotating portion rotates with the motor drive shaft.

3. The motorized window treatment of claim 2, wherein the rotating portion is press-fit onto the motor drive shaft.

4. The motorized window treatment of claim 1, wherein the stationary and rotating portions of the magnetic brake are configured such that common poles of the first plurality of magnets are adjacent to common poles of the second plurality of magnets.

5. The motorized window treatment of claim 1, wherein the rotating portion is retained within the stationary portion.

6. The motorized window treatment of claim 1, wherein the first stationary member is configured to be attached to the motor.

7. The motorized window treatment of claim 6, wherein the rotating portion comprises a first rotating member and a second rotating member.

8. The motorized window treatment of claim 7, wherein the first rotating member and the second rotating member define a plurality of slots, and wherein each of the plurality of slots is configured to receive one of the second plurality of magnets.

9. The motorized window treatment of claim 8, wherein the plurality of slots are configured to enable the second plurality of magnets to be in a first position proximate to the motor drive shaft when the motor drive shaft is not rotating.

10. The motorized window treatment of claim 9, wherein the plurality of slots are configured to enable the second plurality of magnets to be in a second position distal from the motor drive shaft when the motor drive shaft is rotating.

11. The motorized window treatment of claim 10, wherein the second position is a farthest position within the plurality of slots from the motor drive shaft.

12. The motorized window treatment of claim 11, wherein the second plurality of magnets are configured to move within the slots between the first position and the second position as the motor drive shaft transitions between rotating and not rotating.

13. The motorized window treatment of claim 1, wherein the repulsion between the first plurality of magnets and the second plurality of magnets prevents the rotating portion from contacting the first stationary member and the second stationary member.

14. The motorized window treatment of claim 13, wherein the rotating portion is centered between the first stationary member and the second stationary member by the repulsion.

15. The motorized window treatment of claim 1, wherein the first plurality of magnets are spaced a first distance from the motor drive shaft rotational axis and the second plurality of magnets are spaced a second distance from the motor drive shaft rotational axis.

16. The motorized window treatment of claim 15, wherein the second distance is greater than the first distance.

17. The motorized window treatment of claim 1, wherein the first plurality of magnets are separated from the second plurality of magnets in the longitudinal direction.

18. The motorized window treatment of claim 17, wherein poles of the first plurality of magnets face toward like poles of the second plurality of magnets to generate a repelling force between the first and second plurality of magnets.

19. A motorized window treatment comprising:

a roller tube;

a flexible material that is attached to the roller tube;

a motor configured to be located within the roller tube, the motor comprising a motor drive shaft defining a motor drive shaft rotational axis in a longitudinal direction, the motor drive shaft configured to rotate the roller tube to adjust the flexible material between a raised position and a lowered position; and a magnetic brake operatively coupled to the motor drive shaft, the magnetic brake comprising:

a stationary portion comprising a first stationary member, a second stationary member, and a first plurality of magnets, the first stationary member attached to the second stationary member to define a cavity; and a rotating portion comprising a second plurality of magnets, the rotating portion retained within the cavity defined by the attachment of the first stationary member and the second stationary member, wherein the first plurality of magnets are separated from the second plurality of magnets in the longitudinal direction, and wherein the first plurality of magnets are configured to repel the second plurality of magnets such that repulsion between the first plurality of magnets and the second plurality of magnets generates a holding torque that prevents the motor drive shaft from rotating when the motor is not driving the motor drive shaft.

20. The motorized window treatment of claim 19, wherein the rotating portion is coupled to the motor drive shaft such that the rotating portion rotates with the motor drive shaft.

21. The motorized window treatment of claim 20, wherein the rotating portion is press-fit onto the motor drive shaft.

22. The motorized window treatment of claim 19, wherein the stationary and rotating portions of the magnetic brake are configured such that common poles of the first plurality of magnets are adjacent to common poles of the second plurality of magnets.

23. The motorized window treatment of claim 19, wherein the rotating portion is retained within the stationary portion.

24. The motorized window treatment of claim 19, wherein the first stationary member is configured to be attached to the motor.

25. The motorized window treatment of claim 24, wherein the rotating portion comprises a first rotating member and a second rotating member.

26. The motorized window treatment of claim 25, wherein the first rotating member and the second rotating member define a plurality of slots, and wherein each of the plurality of slots is configured to receive one of the second plurality of magnets.

27. The motorized window treatment of claim 26, wherein the plurality of slots are configured to enable the second plurality of magnets to be in a first position proximate to the motor drive shaft when the motor drive shaft is not rotating.

28. The motorized window treatment of claim 27, wherein the plurality of slots are configured to enable the second plurality of magnets to be in a second position distal from the motor drive shaft when the motor drive shaft is rotating.

29. The motorized window treatment of claim 28, wherein the second position is a farthest position within the plurality of slots from the motor drive shaft.

30. The motorized window treatment of claim 29, wherein the second plurality of magnets are configured to move within the slots between the first position and the second position as the motor drive shaft transitions between rotating and not rotating.

31. The motorized window treatment of claim 19, wherein the repulsion between the first plurality of magnets and the second plurality of magnets prevents the rotating portion from contacting the first stationary member and the second stationary member.

32. The motorized window treatment of claim 31, wherein the rotating portion is centered between the first stationary member and the second stationary member by the repulsion.

33. The motorized window treatment of claim 19, wherein the first plurality of magnets are spaced a first distance from the motor drive shaft rotational axis and the second plurality of magnets are spaced a second distance from the motor drive shaft rotational axis.

34. The motorized window treatment of claim 33, wherein the second distance is greater than the first distance.

35. The motorized window treatment of claim 19, wherein poles of the first plurality of magnets face toward like poles of the second plurality of magnets to generate a repelling force between the first and second plurality of magnets.

* * * * *